(12) United States Patent
Yura et al.

(10) Patent No.: US 8,211,253 B2
(45) Date of Patent: Jul. 3, 2012

(54) METHOD OF MANUFACTURING OPTICAL DISPLAY UNIT AND MANUFACTURING SYSTEM OF OPTICAL DISPLAY UNIT

(75) Inventors: Tomokazu Yura, Ibaraki (JP); Kazuo Kitada, Ibaraki (JP); Satoru Koshio, Ibaraki (JP); Takuya Nakazono, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/864,254

(22) PCT Filed: Jan. 27, 2009

(86) PCT No.: PCT/JP2009/051264
§ 371 (c)(1),
(2), (4) Date: Jul. 23, 2010

(87) PCT Pub. No.: WO2009/096388
PCT Pub. Date: Aug. 6, 2009

(65) Prior Publication Data
US 2010/0294418 A1 Nov. 25, 2010

(30) Foreign Application Priority Data

Jan. 29, 2008 (JP) .................................. 2008-017716
Jan. 21, 2009 (JP) .................................. 2009-010704

(51) Int. Cl.
*B32B 41/00* (2006.01)
(52) U.S. Cl. .......... 156/64; 156/360; 156/362; 156/364; 156/367; 156/368; 156/378; 156/379
(58) Field of Classification Search .................... 156/64, 156/360, 362, 364, 367, 368, 378, 379
See application file for complete search history.

(56) References Cited

U.S. PATENT DOCUMENTS
2004/0222814 A1   11/2004 Kim et al.
(Continued)

FOREIGN PATENT DOCUMENTS
JP          57-052017 A    3/1982
(Continued)

OTHER PUBLICATIONS
International Search Report of PCT/JP2009/051264, Mailing Date of Mar. 24, 2009.
(Continued)

*Primary Examiner* — George Koch
(74) *Attorney, Agent, or Firm* — Westerman, Hattori, Daniels & Adrian, LLP

(57) ABSTRACT

Provided are a method of manufacturing an optical display unit and a manufacturing system of the optical display unit wherein in the case of sticking an optical film to an optical display substrate, a defective optical film is eliminated optimally and precision of the elimination can be confirmed. The method is characterized in that in the process of conveying sheet product, a predictive conveyance distance when conveying positional identification information provided to the sheet product from a first position upstream in the conveyance to a second position downstream of the first position in the conveyance is compared with a measured conveyance distance from the first position to the second position obtained by detecting the positional identification information by use of a detection means respectively at the first position and the second position, and the conveyance processing of the sheet product is corrected so that the measured conveyance distance is within the predetermined range of the predictive conveyance distance.

15 Claims, 12 Drawing Sheets

U.S. PATENT DOCUMENTS

| | | | |
|---|---|---|---|
| 2005/0016670 | A1 | 1/2005 | Kanbara et al. |
| 2006/0124248 | A1 | 6/2006 | Kanbara et al. |
| 2009/0218049 | A1 | 9/2009 | Kanbara et al. |

FOREIGN PATENT DOCUMENTS

| | | |
|---|---|---|
| JP | 2-095654 A | 4/1990 |
| JP | 2001-350130 A | 12/2001 |
| JP | 2004-094012 A | 3/2004 |
| JP | 2005-037416 A | 2/2005 |
| TW | I240081 B | 11/2004 |

OTHER PUBLICATIONS

Notification of Transmittal of Copies Translation of the International Preliminary Report on Patentability (Form PCT/IB/338) of International Application No. PCT/JP2009/051264 mailed Sep. 10, 2010 with Forms PCT/IB/373 and PCT/ISA/237.

Taiwanese Office Action dated Oct. 11, 2011, issued in corresponding Taiwanese Patent Application No. 098103088.

Chinese Office Action dated Feb. 13, 2012, issued in corresponding Chinese Patent Application No. 2009-80102820.9.

METHOD OF MANUFACTURING OPTICAL DISPLAY UNIT AND MANUFACTURING SYSTEM OF OPTICAL DISPLAY UNIT

This application is a national stage entry of PCT/JP2009/051264 filed on Jan. 27, 2009.

TECHNICAL FIELD

The present invention relates to a method of manufacturing an optical display unit wherein an optical film piece is bonded onto an optical display substrate, and a manufacturing system thereof.

BACKGROUND ART

Known is a manufacturing method of JP-A-2005-37416 (Patent Document 1): This manufacturing method is a method in which: in a sheet product, an optical film (for example, a polarizing plate) other than a release film is cut, which may be referred to as half cutting hereinafter, so that the continuity of the sheet product is maintained by this release film; and while this release film is peeled off, the optical film is bonded onto an optical display substrate (for example, a liquid crystal panel) through a-pressure-sensitive adhesive.

PRIOR ART DOCUMENT

Patent Document 1: JP-A-2005-37416

DISCLOSURE OF THE INVENTION

Problems to be Solved by the Invention

In the case of the Patent Document 1, a detecting means is used to make a defect-detection of the optical film before the half cutting. As a result, if a defect is detected, the sheet product is cut to avoid this defect. Such a cutting method is called skip cut or a skip cut method. When the skip cut method is adopted, a sheet product is cut to avoid its detects. Thus, only its optical film having no defect is favorably bonded onto an optical display substrate.

In this skip cut method, it is important to consider various device errors in, for example, a defect inspection device, a sheet feeder and a cutting device which constitute a manufacturing system, control errors, mechanical errors generated at the time of continuous and stopping driving thereof, and other errors to conduct a processing for the cutting with a margin for the cutting size so as to exclude defect portions certainly. These errors may become large in accordance with the driving state over a long period, such as 12 hours or 24 hours. In general, therefore, the system is constructed in such a manner that the cutting is made to give margins 2 to 3 times larger than these errors. When it is supposed that one of the errors is positioned, for example, theoretically or experimentally in the range within 50 mm, in radius, of the position of a defect as a center, the system has a structure wherein cutting is made under an assumption that the defect exists, for example, in the range 2 times wider than the error, that is, in the range within 100 mm, in radius, of the central defect position, considering a matter that the system is driven over a long period.

However, when cutting is made with such a margin, the yield ratio of optical films deteriorates. On the other hand, when skip cut is made without considering this margin, there is generated a risk that an optical film containing defects is bonded onto an optical display unit and the resultant may flow out, as a product, as it is. Of the defects, a minute defect as cannot be viewed with the naked eye also exists. Thus, after the optical film is bonded onto the optical display unit, the resultant may be inspected by means of an inspecting device and subjected to reworking process. However, a work therefor is required so that the production efficiency deteriorates very much. Thus, it is desired that precision is raised in skip cut processing.

It is also necessary to inspect periodically whether or not skip cut is precisely made. For this inspection, the following has been hitherto carried out: an optical film is marked with a color felt pen to prepare a temporary defect; the defect is detected by an inspecting device; skip cut is made by a cutting device at a subsequent stage; and it is inspected whether or not the temporary defect is precisely excluded. However, for this inspection, an operator entails a labor for providing the temporary defect; thus, the inspection is troublesome. Furthermore, for this inspection, it is necessary to drive the manufacturing system, or make the inspection after an ordinary driving thereof is discontinued. For this reason, the inspection is undesired from the viewpoint of production efficiency.

In light of the above-mentioned actual situation, the invention has been made. An object thereof is to provide a method of manufacturing an optical display unit and a manufacturing system of an optical display unit that each make it possible that when optical films are each bonded onto an optical display substrate, a defect-containing optical film out of the films is appropriately rejected and further the precision of the exclusion is checked.

Means for Solving the Problems

In order to solve the problems, the inventors have repeatedly made eager researches so as to make the invention described below.

The method of manufacturing an optical display unit according to the invention is a method of cutting a long sheet product wherein a release film is laminated onto an optical film through a pressure-sensitive adhesive layer into a predetermined shape without cutting the release film, peeling off a pressure-sensitive adhesive attached optical film piece obtained by the cutting, which includes the pressure-sensitive adhesive layer and the optical film each having the predetermined shape, from the release film, and bonding the pressure-sensitive adhesive layer side of the optical film piece onto an optical display substrate, thereby manufacturing an optical display unit, wherein in a step of feeding the sheet product, a predicted feed distance at the time of feeding a position specifying data given to the sheet product from a first position at the upstream side of the feeding to a second position at the downstream side of the feeding from the first position is compared with the actually measured feed distance from the first position to the second position, the distance being obtained by detecting the position specifying data by use of a detecting means at each of the first and second positions, and a processing for feeding the sheet product is corrected to set the actually measured feed distance within a predetermined range of the predicted feed distance.

According to this constitution, the predicted feed distance when the product is fed from the first position to the second position can be compared with the actually measured feed distance from the first position to the second position, which is obtained by detecting the position specifying data by use of the detecting means. When the actually measured feed distance is not within the predetermined range of the predicted feed distance, the processing for feeding the sheet product can be corrected to set the actually measured feed distance within the predetermined of the predicted feed distance. In other words, by detecting the feed distance of the sheet product actually, a control for the feeding can be corrected. Thus, the sheet product can be cut into a pressure-sensitive adhesive attached optical film piece corresponding precisely to the optical display substrate to be bonded, and having the predetermined shape.

The position specifying data is a mark, and examples thereof include a laser scar made by laser marking, a color felt pen ink mark made with a color felt pen, an ink mark made with an ink-jet printer, a label, a scratch, a notch, and a punched hole. When the mark is beforehand in the sheet product, the mark is, for example, a two-dimensional code, a label, a line, a hole or a distance value.

The detecting means are each formed in accordance with the position specifying data. Examples thereof include a combination of a photographing means with an image analyzing means, a photodetector, a bar code reader, and a hole-detecting means (for example, a gear), and a distance value detecting means.

In the wording "within a predetermined range of the predicted feed distance", the "predetermined range" is set in accordance with the precision required for a skip cut. The lower limit value and the upper limit value thereof are each, for example, 100 mm or less, more preferably 50 mm or less, even more preferably 20 mm or less.

In the invention, the predicted feed distance is calculated on the basis of a detection result of the detecting means at the first position, and a feeding controller for a feeding means that feeds the sheet product.

According to this constitution, on the basis of the matter that the position specifying data is detected at the first position, the feeding controller controls the feeding means to detect the position specifying data at the second position. The feed quantity in this case corresponds to the predicted feed distance. The feeding means feeds the sheet product in accordance with the feed quantity. This predicted feed distance should be equal to the actual feed distance. However, the predicted feed distance may be largely different from the actual feed distance, as described as the above-mentioned problem. The present application overcomes this appropriately.

In the invention, the actually measured feed distance is calculated on the basis of a feed distance measuring means that measures the feed distance of the sheet product, and a detection result of the detecting means at each of the first and second positions.

According to this constitution, the feed distance measuring means can measure the feed distance of the sheet product, using the detection of the position specifying data at the first position as a starting point, and the detection of the position specifying data at the second position as an end point.

In the invention, the detecting means at the second position is set up at the downstream side of a means for the cutting in the feeding direction, or at the upstream side thereof in the feeding direction.

In a half cut step, there are cases where the sheet product at the position of the cut is stopped. This is a cause of a matter that an error of the feed distance is easily generated. Thus, by setting up the detecting means at the second position at any one of the front and the rear of the cutting means, a correction of the feeding processing can be appropriately made, considering a feed distance error including an effect of the half cut step.

In an embodiment of the invention, the position specifying data is beforehand given onto the sheet product, and the sheet product is wound into a roll form. The position specifying data is the same as described above. The position where the position specifying data is formed is not particularly limited, and may be, for example, an edge region in the width direction of the sheet product, or a central region thereof.

In an embodiment of the invention, the position specifying data is given onto the sheet product at the upstream side of the feeding from the first position.

A means for forming the position specifying data is constructed in accordance with the kind of the position specifying data. Examples thereof include a laser marker, an ink-jet printer, a color felt pen, a labeler, a punching means, and a cutter. Even when a position specifying data is beforehand given to the sheet product, a new position specifying data may be formed therein in the manufacturing process. The position where the position specifying data is formed is not limited as far as the formation at the position substantially does not hinder the function of the detecting means at the first position. The position specifying data may be formed just before the detecting processing made by the detecting means, or the position specifying data may be formed onto a roll-form material.

When the actually measured feed distance is not within the predetermined range of the predicted feed distance, an alarm is issued about this fact in an embodiment of the invention.

According to this manner, at the time when the error is fluctuated by, for example, the driving over a long term, so that the position specifying data, which may be referred to as the quasi-defect, is not precisely excluded, an alarm is issued to the operator about this fact through a warning sound, a warning lamp or the like. Thus, the operator can know that the error becomes large. In this way, the operator can analyze an error fluctuation of the manufacturing system. The resultant analysis data can be effectively used for the adjustment or maintenance of its apparatuses, or for some other. Additionally, the operator can adjust the apparatuses, which are various apparatuses, to prevent the defect from flowing out.

In an embodiment of the invention, the sheet product contains a defect existing in the pressure-sensitive adhesive layer and/or the optical film, and the sheet product is cut into the pressure-sensitive adhesive attached optical film piece from which the defect is excluded, the piece having the predetermined shape.

According to this constitution, a skip cut of the pressure-sensitive adhesive layer and/or optical film wherein the defect exists can be made with a high precision so as to make it possible to appropriately render the obtained pressure-sensitive adhesive attached optical film piece having the predetermined shape a pressure-sensitive adhesive attached optical film piece from which the defect is excluded. When the pressure-sensitive adhesive layer and/or the optical film (each) contain(s) the defect, the defect may be used as the above-mentioned position specifying data.

In an embodiment of the invention, before the first position, the release film is peeled off from the sheet product to make a defect inspection of the optical film and the pressure-sensitive adhesive layer, and after the defect inspection the release film is next laminated onto the pressure-sensitive adhesive layer.

This constitution makes it possible to remove the release film and then make a defect inspection of the optical film and the pressure-sensitive adhesive layer. Thus, without needing to consider a retardation existing in the release film, nor a contaminant, a scratch or any other defect adhering or existing in the release film, any defect of the optical film and the pressure-sensitive adhesive layer can be detected (inspected).

The optical display unit manufacturing system according to another aspect of the invention is a manufacturing system of cutting a long sheet product wherein a release film is laminated onto an optical film through a pressure-sensitive adhesive layer into a predetermined shape without cutting the release film, peeling off a pressure-sensitive adhesive attached optical film piece obtained by the cutting, which includes the pressure-sensitive adhesive layer and the optical film each having the predetermined shape, from the release film, and bonding the pressure-sensitive adhesive layer side of the optical film piece onto an optical display substrate, thereby manufacturing an optical display unit, including:

a feeding means that feeds the sheet product, a feeding control means that controls the feeding means, a comparing means wherein in a step of feeding the sheet product, a predicted feed distance at the time of feeding a position specifying data given to the sheet product from a first position at the upstream side of the feeding to a second position at the downstream side of the feeding from the first position is compared with an actually measured feed distance from the first position to the second position, the distance being obtained by detecting the position specifying data by use of a detecting means at each of the first and second positions, a correcting means that corrects the feeding processing of the sheet product to set the actually measured feed distance within a predetermined range of the predicted feed distance, a cutting means that cuts the sheet product into the pressure-sensitive adhesive attached optical film piece having the predetermined shape, a peeling means that peels off the pressure-sensitive adhesive attached optical film piece from the release film, and a bonding means that bonds the pressure-sensitive adhesive layer side of the pressure-sensitive adhesive attached optical film piece, from which the release film is peeled off, onto an optical display substrate.

This manufacturing system has a structure wherein a sheet product is cut into a pressure-sensitive adhesive attached optical film piece having a predetermined shape by the cutting means, its release film is next peeled off from the pressure-sensitive adhesive attached optical film piece by the peeling means, and then the pressure-sensitive adhesive layer side of the pressure-sensitive adhesive attached optical film piece is bonded onto an optical display substrate by the bonding means. The system has the feeding means, which feeds the sheet product, and the feeding controller, which controls the feeding means. The comparing means has a function of comparing a predicted feed distance at the time of feeding a position specifying data given to the sheet product from a first position at the upstream side of the feeding to a second position at the downstream side of the feeding from the first position with an actually measured feed distance from the first position to the second position, the distance being obtained by detecting the position specifying data by use of the detecting means at each of the first and second positions. The correcting means has a function of correcting the processing for feeding the sheet product to set the actually measured feed distance within a predetermined range of the predicted feed distance.

The predicted feed distance is calculated on the basis of a detection result of the detecting means at the first position, and a feeding controller for the feeding means. Moreover, the actually measured feed distance is calculated on the basis of a feed distance measuring means that measures the feed distance of the sheet product, and a detection result of the detecting means at each of the first and second positions. The feed distance measuring means is made of, for example, an encoder for detecting the rotation number of a feeding means (for example, a pair of rollers) which constitutes a part of the feeding means.

An embodiment of the present manufacturing system has a structure wherein the detecting means at the second position is set up at the downstream side of the cutting means in the feeding direction, or at the upstream side thereof in the feeding direction.

An embodiment of the present manufacturing system has a structure including a position specifying data forming means that gives the position specifying data to the sheet product at the upstream side of the feeding from the first position. Moreover, an embodiment of the present manufacturing system has a structure including an alarming means wherein when the actually measured feed distance is not within the predetermined range of the predicted feed distance, an alarm is issued about this fact.

An embodiment of the present manufacturing system has a structure wherein the sheet product contains a defect existing in the pressure-sensitive adhesive layer and/or the optical film, and the sheet product is cut into the pressure-sensitive adhesive attached optical film piece from which the defect is excluded, the piece having the predetermined size. For example, the system preferably has a structure wherein a defect inspection is made before the optical film is bonded to the optical display substrate (for example, a liquid crystal panel) through the pressure-sensitive adhesive layer, and the optical film and/or the pressure-sensitive adhesive layer that (each) contain(s) any defect is rejected. Specifically, the system preferably has a structure wherein a detecting device that makes a defect-detection is formed, the cutting means makes a skip cut of the sheet product to exclude any defect detected by the detecting device, and further the optical film and the pressure-sensitive adhesive layer which are obtained by making the half cut of the sheet product by the cutting means and each contains the defect are rejected.

An embodiment of the present manufacturing system has a structure further including:

a peeling means that peels off the release film from the sheet product before the first position, a defect inspection means that makes a defect inspection of the optical film and the pressure-sensitive adhesive layer after the release film is peeled off, and a laminating means that laminates a release film onto the pressure-sensitive adhesive layer after the defect inspection.

The effects and the advantages of the manufacturing system are equivalent to those of the above-mentioned manufacturing method.

The optical display substrate in the invention is, for example, a liquid crystal panel made of a glass substrate unit for a liquid crystal cell, or an organic EL emitter substrate.

DESCRIPTION OF REFERENCE NUMERALS

| | |
|---|---|
| F1 | first sheet product |
| F2 | second sheet product |
| F11 | first optical film |
| F11a | first polarizer |
| F11b | first film |
| F11c | second film |
| F12 | first release film |
| F13 | surface protecting film |
| F14 | first pressure-sensitive adhesive layer |
| F21 | second optical film |
| F21a | second polarizer |
| F21b | third film |
| F21c | fourth film |
| F22 | second release film |
| F23 | surface protecting film |
| F24 | second pressure-sensitive adhesive layer |
| W | liquid crystal panel (optical display substrate) |
| 1 | controller |
| 10 | polishing washing apparatus |
| 11 | water polishing apparatus |
| 12 | first feeder |
| 13 | first pre-inspection peeling apparatus |
| 14 | first detect inspection apparatus |
| 15 | first release film laminating apparatus |
| 16 | first cutting apparatus |
| 17 | first peeling apparatus |
| 18 | first bonding apparatus |
| 19 | first rejecting apparatus |
| 22 | second feeder |
| 23 | second pre-inspection peeling apparatus |
| 24 | second defect inspection apparatus |
| 25 | second release film laminating apparatus |
| 26 | second cutting apparatus |
| 27 | second peeling apparatus |
| 28 | second bonding apparatus |
| 29 | second rejecting apparatus |
| 201 | marking apparatus |
| 202 | photographing means |
| 203 | quasi-defect detecting apparatus |
| 204 | positional data determining means |
| 205 | cut position correcting means |
| 301 | image analyzing means |
| 302 | encoder |
| 303 | memory |
| 304 | comparing means |
| 305 | correcting means |
| 306 | feeding controller |
| 307 | actually measured feed distance calculating means |
| 308 | predicted feed distance calculating means |

EMBODIMENTS FOR CARRYING OUT THE INVENTION

Embodiment 1

Figure 1:
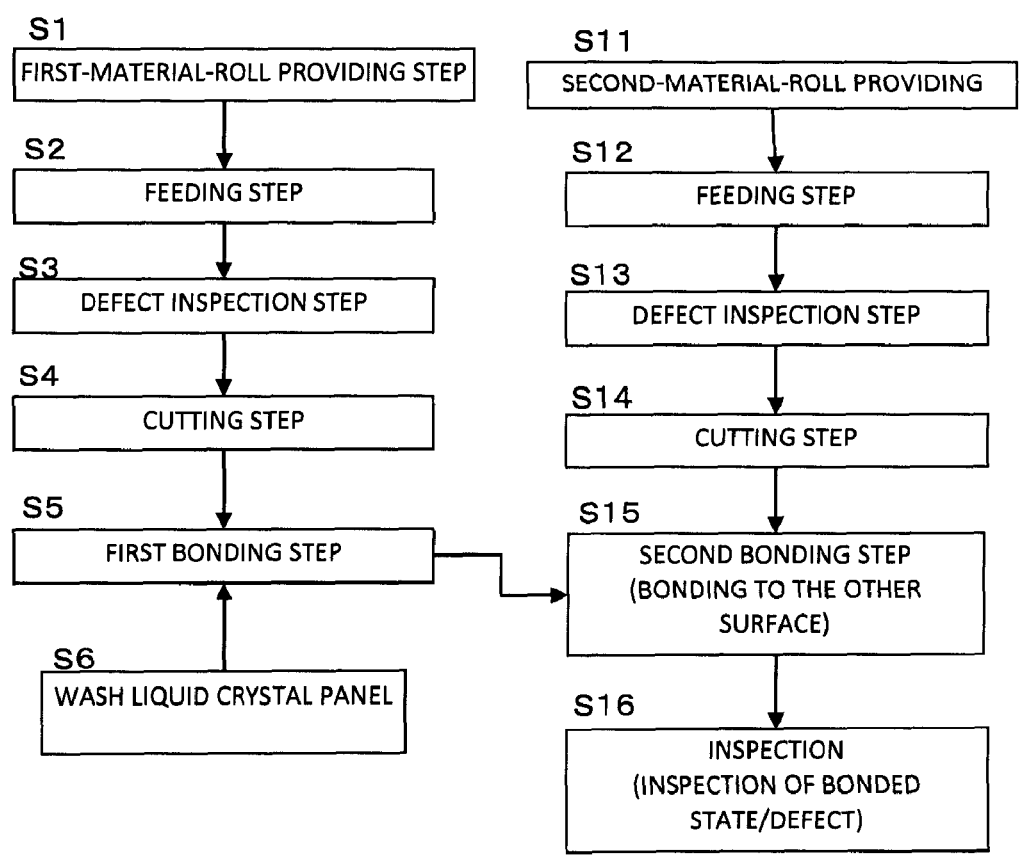
FIG. 1 The figure is a flowchart of an optical display unit manufacturing method of Embodiment 1.
Figure 3:
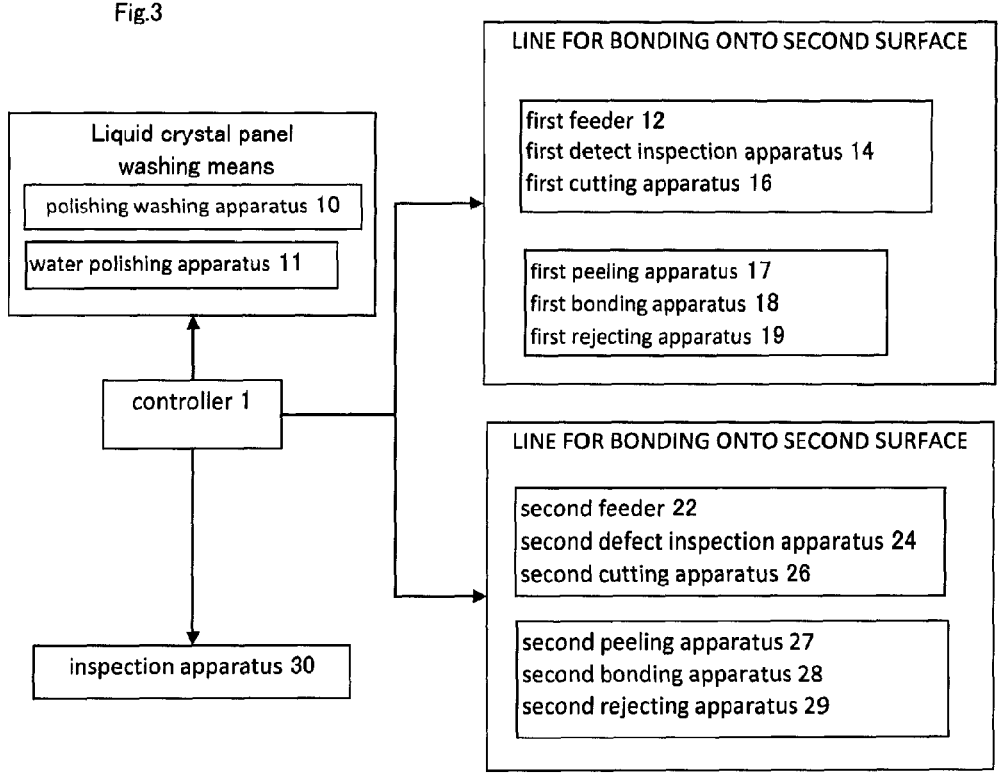
FIG. 3 The figure is a view referred to in order to describe a manufacturing system of Embodiment 1.

Embodiment 1 of the invention will be described hereinafter. FIG. 1 shows a flowchart of a method of Embodiment 1 for manufacturing an optical display unit. FIG. 3 shows an example of a device structure of a manufacturing system therefor. The manufacturing system of Embodiment 1 is a structure example wherein out of constituents of a manufacturing system of Embodiment 2, which will be described later, first and second pre-inspection peeling devices 13 and 23 and first and second release film laminating devices 15 and 25 are not set up. As another embodiment of the manufacturing system of Embodiment 1, a structure wherein first and second defect inspection devices 14 and 24 are not set up can also be given as an example.

(Optical Film)

The optical film laid on the optical display substrate in the invention may be an optical film that can be used in, for example, a liquid crystal display device and may be of various types. The optical film is, for example, a polarizer, a retardation film, a viewing angle compensation film, a brightness enhancement film, or an optical film wherein two or more of these films are combined with each other so as to be laminated onto each other. A transparent film for protection (for example, a polarizer protecting film, which will be described later) may be laminated onto a surface of each of these films. A pressure-sensitive adhesive layer is formed on one of the surfaces of the optical film, so that the optical film can be bonded onto the optical display substrate. To protect this pressure-sensitive adhesive layer, a release film is laid thereon. A surface protecting film may be laid onto the other surface of the optical film directly or with a pressure-sensitive adhesive layer interposed therebetween. Specific examples of these films will be described later. The release film is peeled off from the pressure-sensitive adhesive layer formed on the optical film surface which the release film contacts, and the surface protecting film is peeled off from the optical film, together with the pressure-sensitive adhesive layer to which the protecting film bonds. In the following description, an optical film on which a pressure-sensitive adhesive layer is laminated may be referred to as a pressure-sensitive adhesive attached optical film. A film wherein onto this pressure-sensitive adhesive attached optical film is/(are) further laminated a release film (or a release film, a surface protecting film, and a pressure-sensitive adhesive layer for bonding this surface protecting film onto the optical film) may be referred to as a sheet product.

(Manufacturing Flowchart)

Figure 9:
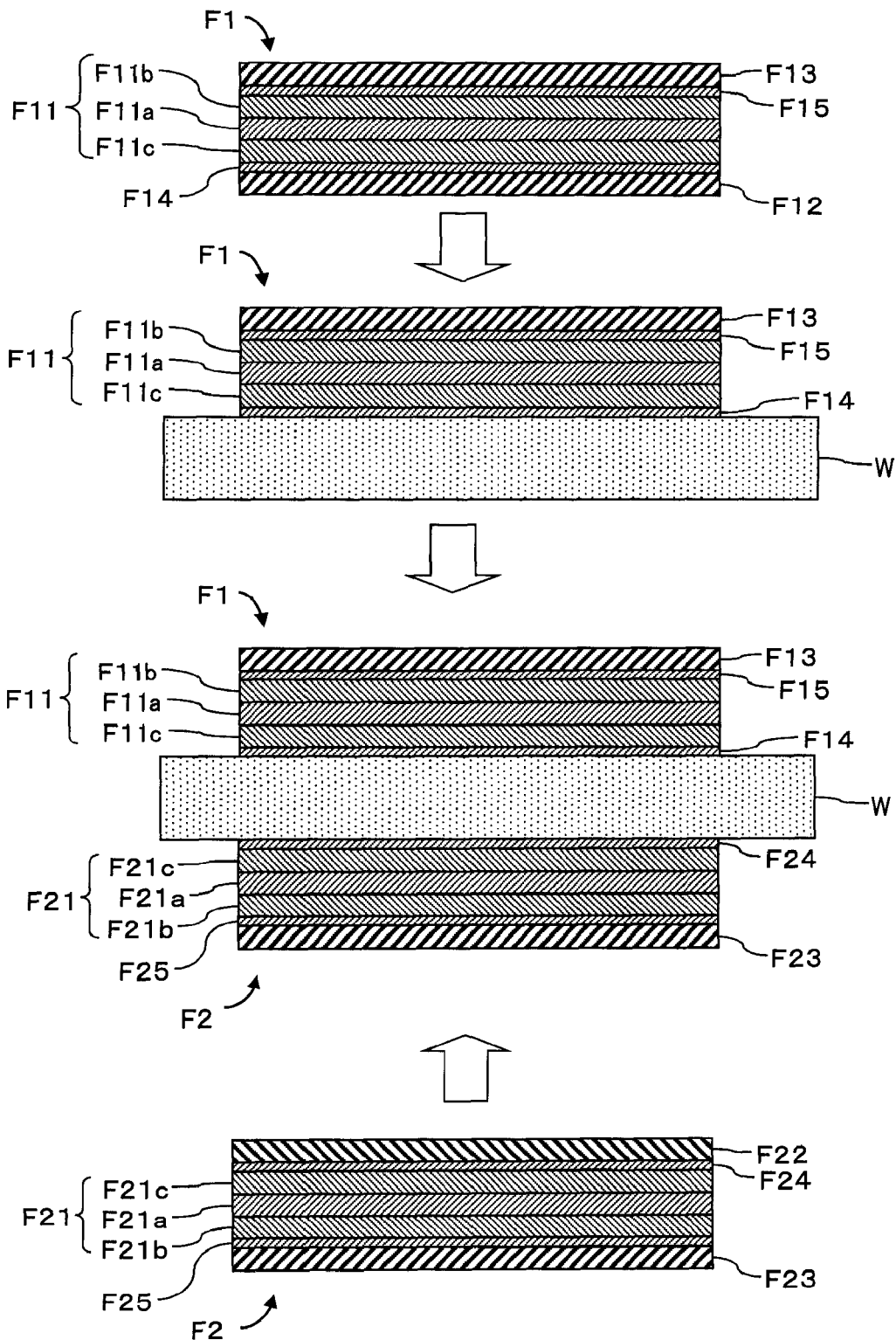
FIG. 9 The figure is a view referred to in order to describe an example of the lamination structure of first and second sheet products.

(1) First-material-roll providing step (FIG. 1, S1): A long first sheet product is provided as a first material roll. The width of the first material roll depends on the bonding size of an optical display substrate. As illustrated in FIG. 9, the lamination structure of a first sheet product F1 is a structure wherein a first optical film F11 and a first release film F12 are laminated onto each other to interpose a first pressure-sensitive adhesive layer F14 therebetween. FIG. 9 illustrates the lamination structure of the first sheet product that further has a surface protecting film F13. For example, the first optical film F11 is composed of a first polarizer F11a, a first film F11b with an adhesive layer (not illustrated) interposed between the first film and one of the surfaces of the polarizer, and a second film F11c with an adhesive layer (not illustrated) interposed between the second film and the other surface thereof.

The first and second films F11b and F11c are each, for example, a polarizer protecting film (for example, a triacetyl-cellulose film or a PET film). The second film F11c is faced toward an optical display substrate surface to be bonded onto the surface with the first pressure-sensitive adhesive layer F14 therebetween (at this time, the first release film F12 is peeled off). The first film F11b may be subjected to a surface treatment. Examples of the surface treatment include hard coating, anti-reflection treatment, and treatment for preventing sticking, diffusion, anti-glare or the like. The first release film F12 is laid on the second film F11c to interpose the first pressure-sensitive adhesive layer F14 therebetween. The surface protecting film F13 is laid on the first film F11b to interpose a pressure-sensitive adhesive layer F15 therebetween. Specific structures of the first and second films F11b and F11c will be described later. In the following description, a lamination structure composed of a polarizer and a polarizer protecting film may be referred to as a polarizing plate.

Individual steps described below are performed inside an isolated equipment isolated from the inside of a factory. Cleanliness is kept therein. It is particularly important that cleanliness is kept in a bonding step of bonding the optical film to an optical display unit.

(2) Feeding step (FIG. 1, S2): From the provided and set first material roll, the first sheet product F1 is rolled out, and fed toward the downstream side of the manufacturing system of the optical display unit according to the invention. A first feeding device 12 for feeding the first product F1 is composed of, for example, a pair of nip rollers, a guide roller, a rotary drive, an accumulator A, a sensor, a controller and others.

(3) First inspection step (FIG. 1, S3: The step corresponds to a detect inspection step.): A first defect inspection device 14 is used to inspect any defect or quasi-defect of the first sheet product F1 (made substantially of the first optical film F11 and the first pressure-sensitive adhesive layer F14). The method for the defect inspection referred to herein is, for example, a method of performing imaging of both surfaces of the first product F1 by use of light transmitted therein and/or light reflected thereon, and subjecting the resultant data to image processing. When the first sheet product F1 contains a polarizer, the method may be a method of arranging a polarizing film for inspection in the state that the film and the polarizing axis of the first sheet product are under a crossed nicols relation state (the state may be referred to as 0-degree cross), performing imaging through transmission light transmitted through the polarizing film for inspection and the first sheet product F1 by use of a CCD camera, and then subjecting the resultant data to image processing, or a method of arranging a polarizing film for inspection in the state that the film gives a predetermined angle (in the range of, for example, 0 to 10 degrees) from the polarizing axis of the first sheet product (the state may be referred to as x-degree cross), performing imaging through transmission light transmitted through the polarizing film for inspection and the first sheet product F1 by use of a CCD camera, and then subjecting the resultant data to image processing. The algorithm of the image processing may be a known manner. For example, the defect-detection can be made by grayscale determination based on binarization. The method for the defect inspection is not limited to the method based on performing imaging by use of the CCD camera and image processing. Thus, a method capable of determining the intensity of the transmitted light or the reflected light, a change in the wavelength, or the like may be used.

The first defect inspection device 14 is made of, for example, area sensors such as CCD cameras, and plural lines thereof are set up in accordance with the size of the width of the first sheet product F1, which is perpendicular to the feeding direction thereof. The scope of the area where images are to be photographed is, for example, an area of 10000 $mm^2$=100 mm in the feeding direction×100 mm in the width direction. When the defect-detection can be made by image processing analysis, the area is fractionized. The fractional size is, for example, 25 $mm^2$=5 mm in the feeding direction×5 mm in the width direction. In each of the fractional inspection areas, defects (the kinds, the sizes and the number thereof) are detected by image processing analysis. The position coordinates of each of the detected defects are memorized as position coordinates of the inspection area (the fractional area) thereof. In other words, the absolute coordinates of each of the defect are not calculated, and the position of the defects is memorized as the coordinates of the inspection area thereof. Such a structure makes it possible to shorten the processing period required for the detection of the defects largely. Defect data formed in this case are composed of, for example, the kinds, the sizes, the numbers, the inspection area coordinates, and the identification numbers of the defects, and image data of the inspection areas. The defect data are associated with the photographed image data (the image data before the fractionalization). The defects data are transmitted to a first cutting device 16. By making the inspection areas small, the resolving power of the positions of the defects is made high. It is allowable to transmit the image data photographed by the first defect inspection device 14 into a controller 1, subject the data to image analysis in the controller 1 to detect defects, and then prepare data on the defects.

In the performing imaging/image processing method through transmitted light, contaminants inside the first sheet product F1 can be detected. In the performing imaging/image processing method through reflected light, adhesive contaminants on the surface of the first sheet product F1 can be detected. In the performing imaging/image processing method according to the 0-degree cross, surface contaminants, stains, and internal contaminants can be mainly detected as bright spots. In the performing imaging/image processing method according to the x-degree cross, knicks can be mainly detected.

The data on the defects obtained by the first defect inspection device 14 are transmitted to the controller 1, and supplied for a cutting method performed by a first cutting device 16, which will be described later. In the present embodiment, the defect data are used in order to subject the defects to skip cut. The structure of the defect data and the skip cut in the embodiment will be described later. The above-mentioned defect inspection can be carried out when the sheet product is manufactured. The defect data obtained at this time may be attached, as a bar cord or the like, directly to the sheet product. Alternatively, it is allowable to take the defect data into a separate medium (examples thereof include a floppy (registered trade name) disc, various media such as a CD-RW, and memory devices such as a hard disc) and supply the data to the controller 1 of the optical display unit manufacturing system of the invention.

(4) First cutting step (FIG. 1, S4): The first cutting device 16 makes a cut (half cut) of the surface protecting film F13, the pressure-sensitive adhesive layer F15, the first optical film F11 and the first pressure-sensitive adhesive layer F14 other than the first release film F12 into a predetermined size. Examples of the cutting means therefor include a laser, a cutter, and other known cutting means.

The controller 1 controls the timing of the cutting made by the first cutting device 16. When the first sheet product F1 is fed so that a cut position thereof arrives at the first cutting device 16, the controller 1 causes the accumulator A to be operated and then controls the feeding device 12 in such a manner that the feeding of the product F1 past the accumulator A is stopped. When the first sheet product F1 is stopped at the position for cutting, the controller 1 sends a cutting command to the first cutting device 16. On the basis of this command, the first cutting device 16 makes a cut (half cut) of the first sheet product F1. The controller 1 is constructed to make the cut on the basis of the defect data to avoid the defects (the structure for the cutting is a cutting structure for a skip cut manner). Details of this operation will be described later. This step produces an improvement in the yield ratio of first optical films F11. The first optical film F11 which is a defect-containing first optical film is rejected by means of a first rejection device 19, which will be described later, and will not be attached to any liquid crystal panel W.

(5) First bonding step (FIG. 1, S5): While a first peeling device 17 is used to remove the first release film F12, a first bonding device 18 is used to bond the first pressure-sensitive adhesive attached optical film (containing the surface protecting film F13 and the pressure-sensitive adhesive layer F15), from which the first release film F12 has been removed, onto a liquid crystal panel W through its first pressure-sensitive adhesive layer F14. At the time of the bonding, the first pressure-sensitive adhesive attached optical film and the liquid crystal panel W are sandwiched between a pair of rolls (181 and 182) so as to be bonded to each other under pressure, which will be described later.

(6) Cleaning step (FIG. 1, S6): As illustrated in FIG. 3, the surfaces of the liquid crystal panel W are cleaned by a polishing cleaning apparatus 10 and a water cleaning apparatus 11. The cleaned liquid crystal panel W is fed to the first bonding apparatus 18 by a feeding mechanism R. The feeding mechanism R is composed of, for example, a feeding roller, a feeding direction switching mechanism, a rotary drive, a sensor, a controller and others. The polishing cleaning apparatus 10 and the water cleaning apparatus 11 will be described later.

It is preferred that the first-material-roll providing step, the first inspection step, the first cutting step, the first optical film bonding step, and the cleaning step are carried out in a continuous manufacturing line. In the manufacturing step series, the first pressure-sensitive adhesive attached optical film is bonded onto one of the surfaces of the liquid crystal panel W. The liquid crystal panel wherein the first optical film. F11 is laid on the surface is represented by reference symbol W1. The following will describe a manufacturing process in which a second optical film F21 is laid on the other surface.

(7) Second-material-roll providing step (FIG. 1, S11): A long second sheet product F2 is provided as a second material roll. As illustrated in FIG. 9, the lamination structure of the second sheet product F2 has the same as the first sheet product. However, the lamination structure is not limited thereto. In the second sheet product F2, a second optical film F21 and a second release film. F22 are laminated onto each other to interpose a second pressure-sensitive adhesive layer F24 therebetween. FIG. 9 illustrates the lamination structure of the second sheet product that further has a surface protecting film F23. For example, the second sheet product has the surface protecting film F23. The second optical film F21 is composed of a second polarizer F21a, a third film F21b with an adhesive layer (not illustrated) interposed between the third film and one of the surfaces of the polarizer, and a fourth film F21c with an adhesive layer (not illustrated) interposed between the fourth film and the other surface thereof.

The third and fourth films F21b and F21c are each, for example, a polarizer protecting film (for example, a triacetyl-cellulose film or a PET film). The fourth film F21c is faced toward an optical display substrate surface to be bonded onto the surface with the second pressure-sensitive adhesive F24 therebetween (at this time, the second release film F22 is peeled off). The third film F21b may be subjected to a surface treatment. Examples of the surface treatment include hard coating, anti-reflection treatment, and treatment for preventing sticking, diffusion, anti-glare or the like. The second release film F22 is laid on the fourth film F21c to interpose the second pressure-sensitive adhesive layer F24 therebetween. The surface protecting film F23 is laid on the third film F21b to interpose a pressure-sensitive adhesive layer F25 therebetween. Specific structures of the third and fourth films F21b and F21c will be described later.

(8) Feeding step (FIG. 1, S12): From the provided and set second material roll, the second sheet product F2 is rolled out, and fed toward the downstream side of the manufacturing system of the optical display unit according to the invention. A second feeder 22 for feeding the second product is composed of, for example, a pair of nip rollers, a guide roller, a rotary drive, an accumulator A, a sensor, a controller and others.

(9) Second inspection step (FIG. 1, S13: The step corresponds to a detect inspection step.): A second defect inspection apparatus 24 is used to inspect any defect or quasi-defect of the second sheet product F2 (made substantially of the second optical film F21 and the second pressure-sensitive adhesive layer F24). The method for the defect inspection referred to herein is equivalent to the method performed by the first defect inspection apparatus 14.

(10) Second cutting step (FIG. 1, S14): A second cutting apparatus 26 makes a cut (half cut) of the surface protecting film F23, the pressure-sensitive adhesive layer F25, the second optical film F21 and the second pressure-sensitive adhesive layer F24 other than the second release film F22 into a predetermined size. The timing of the cutting is controlled by the controller 1, and further the controller 1 is constructed to make the cut on the basis of the defect data obtained by the second defect inspection apparatus 24 to avoid the defects. This step produces an improvement in the yield ratio of second optical films F21. The second optical film F21 which is a defect-containing second optical film is rejected by means of a second rejection apparatus 29, which will be described later, and will not be attached to the liquid panel W1.

(11) Second bonding step (FIG. 1, S15): While a second peeling apparatus 27 is used to remove the second release film F22 after the second cutting step, a second bonding apparatus 28 is used to bond, through the second pressure-sensitive adhesive layer F24, the second pressure-sensitive adhesive attached optical film (containing the surface protecting film F23 and the pressure-sensitive adhesive layer F25), from which the second release film F22 has been removed, onto a surface of the liquid crystal panel W1 that is different from the liquid crystal panel surface on which the first optical film F11 is bonded. Before the second pressure-sensitive adhesive attached optical film (containing the second optical film F21) is bonded onto the liquid crystal panel W1, there may be caused a case where the liquid crystal panel W1 is rotated at 90 degrees by the feeding direction switching mechanism of the feeding mechanism R to make the first optical film F11 and the second optical film F21 into a crossed nicols relation.

At the time of the bonding, the second pressure-sensitive adhesive attached optical film and the liquid crystal panel W1 are sandwiched between rolls so as to be bonded to each other under pressure, which will be described later.

(12) Inspection step (FIG. 1, S16): An inspection apparatus 30 inspects a liquid crystal panel W12 on both surfaces of which the optical films are bonded. The method for the inspection is, for example, a method of performing imaging of both surfaces of the liquid crystal panel W12 by use of light reflected thereon, and subjecting the resultant data to image processing. Another example of the inspecting method is a method of radiating a light source onto one of the surfaces of the liquid crystal panel W12, photographing a transmission image based on transmitted light rays thereof from the other surface, and subjecting the resultant data to image processing. In this case, defects are detected as bright spots. An additional example thereof is a method of setting a polarizing film for inspection between the CCD cameras and the object to be inspected. The algorithm of the image processing may be a known manner. For example, the defect-detection can be made by gray scale determination based on binarization.

(13) On the basis of the data on the defects obtained by the inspection apparatus 30, a determination is made as to whether or not the liquid crystal panel W12 is a non-defective product. When judged to be non-defective, the liquid crystal panel W12 is fed into the next packaging step. When judged not to be non-defective, the panel is subjected to reworking process. Optical films are newly bonded onto the panel, and next the panel is inspected. When determined to be non-defective, the panel is shifted to the packaging step. When determined not to be non-defective, the panel is again shifted to reworking process, or put on the discard.

In the above-mentioned the manufacturing step series, an optical display unit can be appropriately manufactured by carrying out the first bonding step of the liquid crystal panel and the first optical film F11 and the second bonding step of the panel and the second optical film F21 in a continuous manufacturing line. When the individual steps are performed, in particular, inside an isolated equipment isolated from the factory inside, optical films can each be bonded onto a liquid crystal panel (optical display substrate) in an environment wherein cleanliness is kept. Thus, high-quality optical display units can be manufactured.

(Skip cut method, and skip cut precision checking processing)

Figure 10:
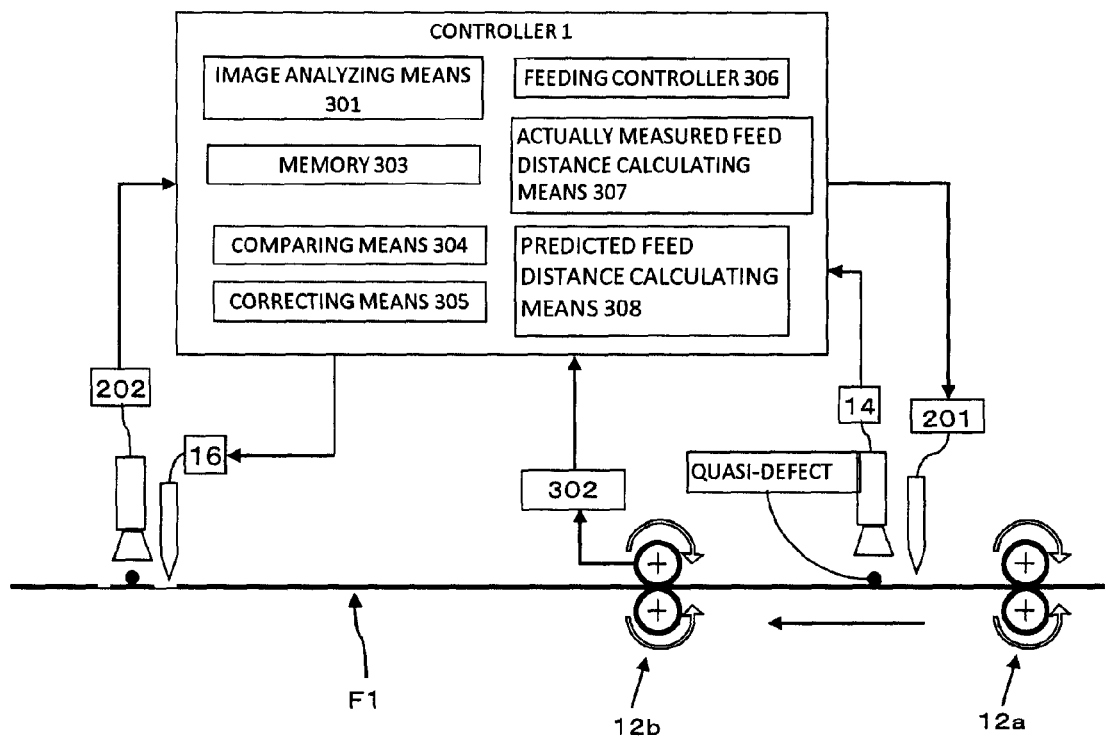
FIG. 10 The figure is a view referred to in order to describe the function and structure of Example 1.
Figure 12:
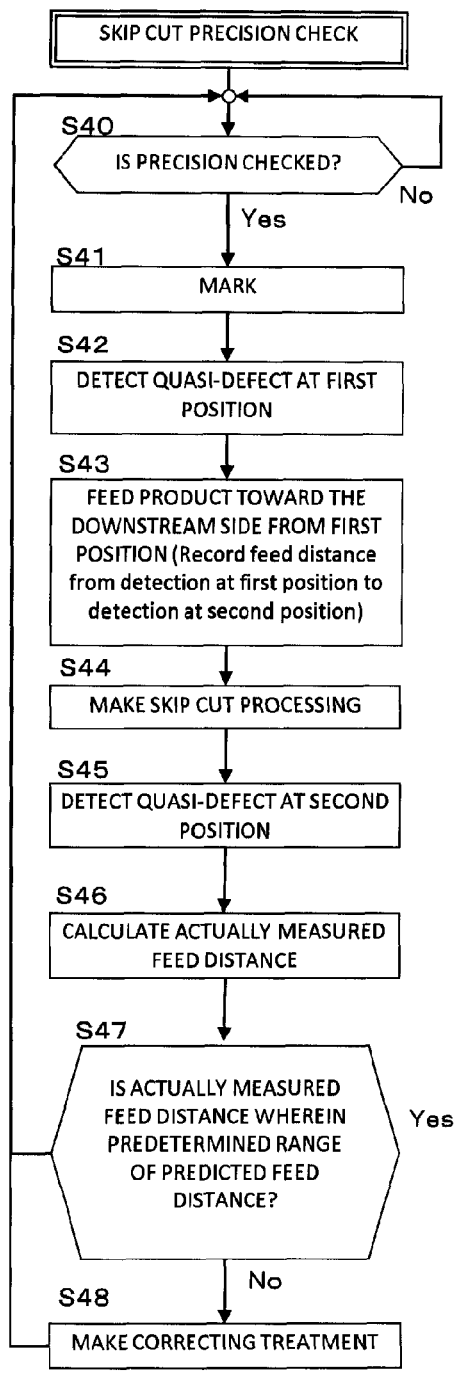
FIG. 12 The figure is a flowchart referred to in order to describe the operation of Example 1.

A description will be made on a skip cut method of Example 1 and a skip cut precision checking processing thereof. FIG. 10 shows a system structure for the skip cut check of Example 1. FIG. 12 is a flowchart of the skip cut precision checking processing. Herein, shown is an example wherein the defect inspection apparatus for inspecting any defect of a sheet product is used also as an apparatus for detecting any position specifying data, which may be referred to as quasi-defect, set on the sheet product in order to check the skip cut precision. In accordance with the kind of the position specifying data, the data may be detected by a position specifying data detecting apparatus placed separately from the defect inspection apparatus.

The controller 1 has an image analyzing means 301, a memory 303, a comparing means 303, a correcting means 305, a feeding controller 306, an actually measured feed distance calculating means 307, a predicted feed distance calculating means 308, and other functions.

The feeding controller 306 is a function of controlling the feeder 12. The image analyzing means 301 is a function of analyzing image data from the first defect inspection apparatus 14 and a photographing means 202, and knowing the kind of any defect, the coordinate position of a sheet product, the coordinate position of any quasi-defect defect, and others. The memory 303 stores various data, and memorizes, for example, measurement data of an encoder 302 for measuring the rotation quantity of a feeding means 12b that constitutes a part of the feeder for the sheet product F1. The feeding means 12b is composed of a pair of rolls, or pairs of rolls, and has a structure wherein the sheet product F1 is fed while sandwiched between the rolls. The feeding means 12b is also controlled by the feeding controller 306.

The actually measured feed distance calculating means 307 calculates the feed quantity from a position where a quasi-defect is detected by the first defect inspection apparatus 14 (first position) to a position where the quasi-defect is again defected by the photographing means 202 (second position), the quantity being measured by the encoder 302. This feed quantity corresponds to an actually measured feed distance. For example, in a case where measurement made by the encoder 302 is started from a time when the quasi-defect is detected at the first position and then the measurement is finished at a time when the quasi-defect is again detected at the second position, the measurement quantity according to the encoder 302 is obtained as the actually measured feed distance. It is allowable to make the encoder 302 into a measurable state at any time and calculate the actually measured feed distance by subtracting the measurement value at the time when the quasi-defect is detected at the first position from the measurement value at the time when the quasi-defect is detected at the second position.

The predicted feed distance calculating means 308 calculates a predicted feed quantity from the position where the quasi-defect is detected by the first defect inspection apparatus 14 (first position) to the position where the quasi-defect is again defected by the photographing means 202 (second position). This feed quantity corresponds to a predicted feed distance. This feed quantity is set from, for example, an experiential value of a test operation, an actual operation or the like. On the basis of this feed quantity, the feeding means 12b is controlled.

The comparing means 304 is a function of comparing the predicted feed distance with the actually measured feed distance and determining whether or not the actually measured feed distance is within a predetermined range of the predicted feed distance.

The correcting means 305 is a function of correcting the feeding processing of the sheet product to make the actually measured feed distance into the predetermined range of the predicted feed distance. The correcting means 305 corrects, for example, a measuring function of the encoder. This correcting processing may be automatically made, or may be made by operator's input operation.

A description will be made, using the operation flowchart of FIG. 12. First, it is determined whether or not the precision of a skip cut is checked (S40). Examples of the timing when quasi-defects are attached include a period when the system is adjusted before the start of the manufacture, periodic times during the manufacture, a period when a maintenance is made, and times when it is desired that the precision of defect-cutting is checked. This timing may be beforehand set, or may be set at will through a manual switch. In this way, the quasi-defects can be more easily marked automatically or through the manual switch than by the handwriting of temporary defects with a color felt pen as performed in the prior art.

Marking step (position specifying data forming step) (S41): As illustrated in FIG. 10, a position specifying data forming means 201 is used at the feeding upstream side of the defect inspection apparatus 14 to attach a quasi-defect. It is allowable to attach a predetermined quasi-defect beforehand onto the sheet product when the product is manufactured, and then supply this quasi-defect attached sheet product to the optical display unit manufacturing system of the invention. In this case, the position specifying data forming means 201 may be omitted in the system of the invention.

Next, the quasi-defect marked on the first sheet product F1 is detected by the defect inspection apparatus 14 (S42). By the detection, the first sheet product F1 is fed into the feeding direction downstream side by the feeding means 12b. At this time, the encoder 302 measures the rotation quantity (feed quantity) of the feeding means 12b, and the measurement data are recorded in the memory 303.

The first sheet product F1 to which the quasi-defect is attached is fed toward the downstream side. On the basis of a skip cut control command given by the controller 1, the feeder 12 and the cutting apparatus 16 are controlled so that the first sheet product F1 containing the quasi-defect is subjected to a skip cut processing (S44). The quasi-defect subjected to the skip cut processing is detected by the photographing means 202 set up at the downstream side of the cutting apparatus 16 in the feeding direction (S45). By this detection, the actually measured feed distance is calculated (S46).

Next, it is determined whether or not the actually measured feed distance is within the predetermined range of the predicted feed distance (S47). When the actually measured feed distance is within the predetermined range of the predicted feed distance, the present process is returned to the step S40. When the distance is not within the range, a correcting processing is conducted (S48).

Figure 11:
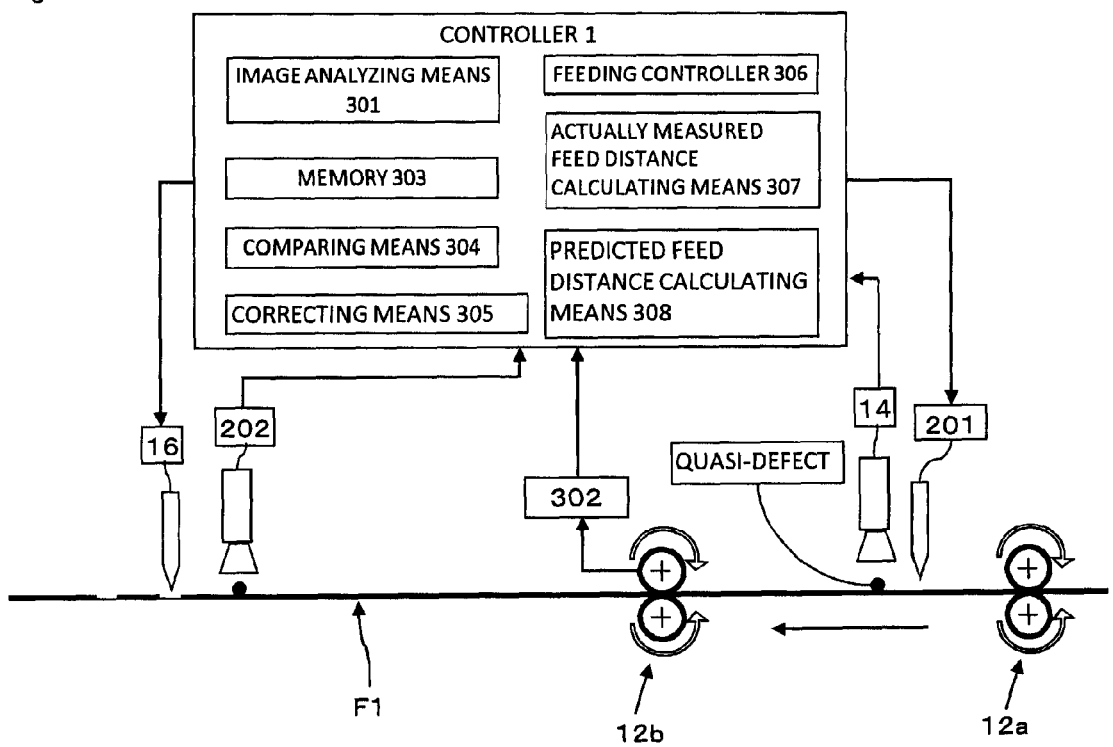
FIG. 11 The figure is a view referred to in order to describe the function and structure of Example 2.
Figure 13:
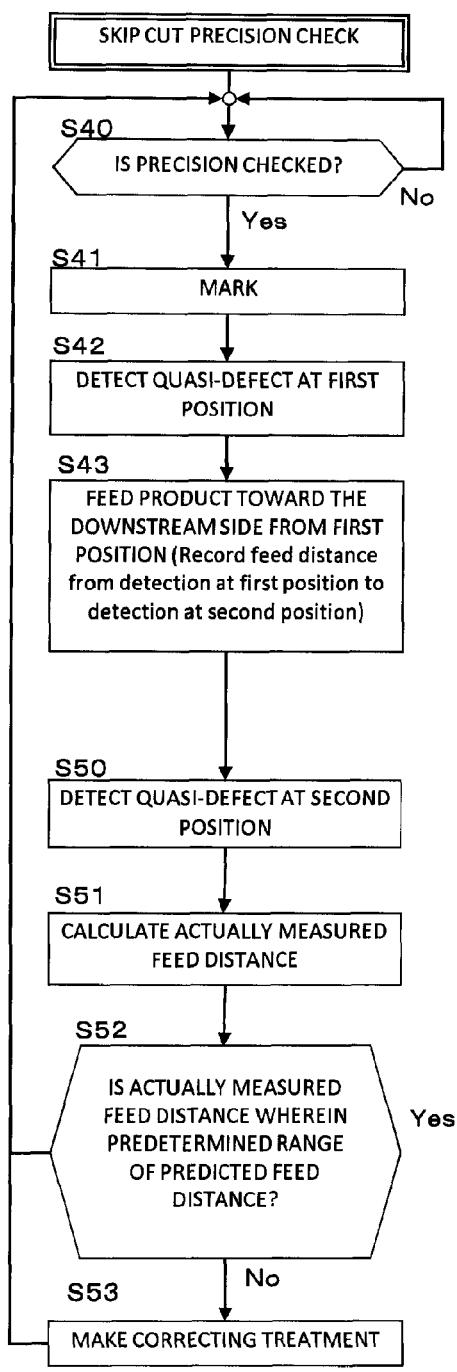
FIG. 13 The figure is a flowchart referred to in order to describe the operation of Example 2.

Next, a description will be made on a skip cut method of Example 2 and a skip cut precision checking processing thereof. FIG. 11 shows a system structure for the skip cut check. FIG. 13 is a flowchart of the skip cut precision checking processing. About each of the same constituents as in Example 1, any description thereof will be omitted or a brief description will be made. In Example 2, a photographing means 202 is set up at the upstream side of a cutting apparatus 16 in the feeding direction.

A description will be made, using the operation flowchart of FIG. 13. First, it is determined whether or not the precision of a skip cut is checked (S40). Next, as illustrated in FIG. 11, a position specifying data forming means 201 is used at the feeding upstream side of a defect inspection apparatus 14 to attach a quasi-defect (S41).

Next, the quasi-defect marked on the first sheet product F1 is detected by the defect inspection apparatus 14 (S42). By the detection, the first sheet product F1 is fed toward the feeding direction downstream side by a feeding means 12b. At this time, an encoder 302 measures the rotation quantity (feed quantity) of the feeding means 12b, and the measurement data are recorded in a memory 303.

The first sheet product F1 to which the quasi-defect is attached is fed toward the downstream side. The quasi-defect is detected by the photographing means 202 set up at the upstream side of the cutting apparatus 16 in the feeding direction (S50). By this detection, the actually measured feed distance is calculated (S51).

Next, it is determined whether or not the actually measured feed distance is within a predetermined range of a predicted feed distance (S52). When the actually measured feed distance is within the predetermined range of the predicted feed distance, the present process is returned to the step S40. When the distance is not within the range, a correcting processing is conducted (S53).

Figure 14:
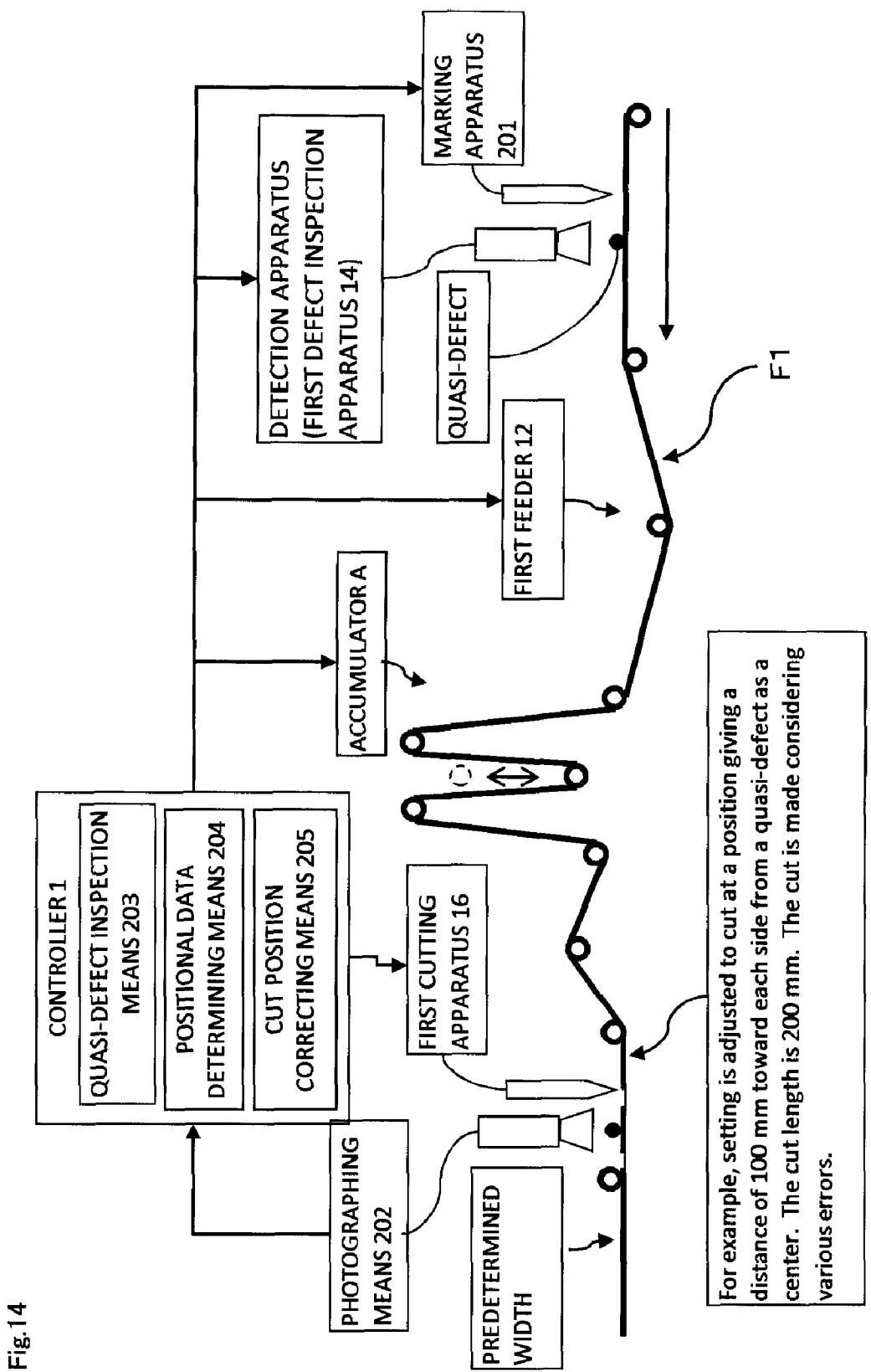
FIG. 14 The figure is a view referred to in order to describe the function and structure of Example 3.
Figure 15:
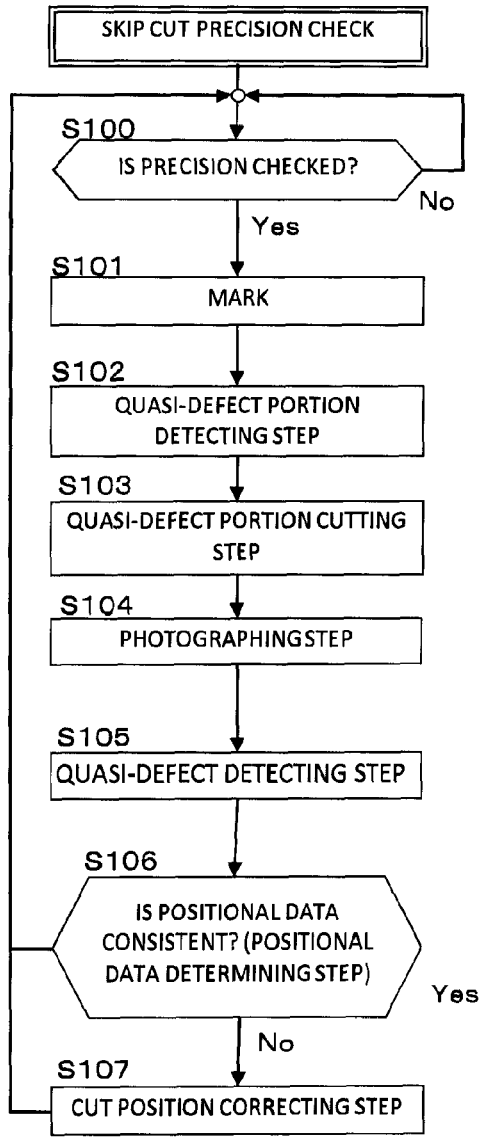
FIG. 15 The figure is a flowchart referred to in order to describe the operation of Example 2.
Figure 16:
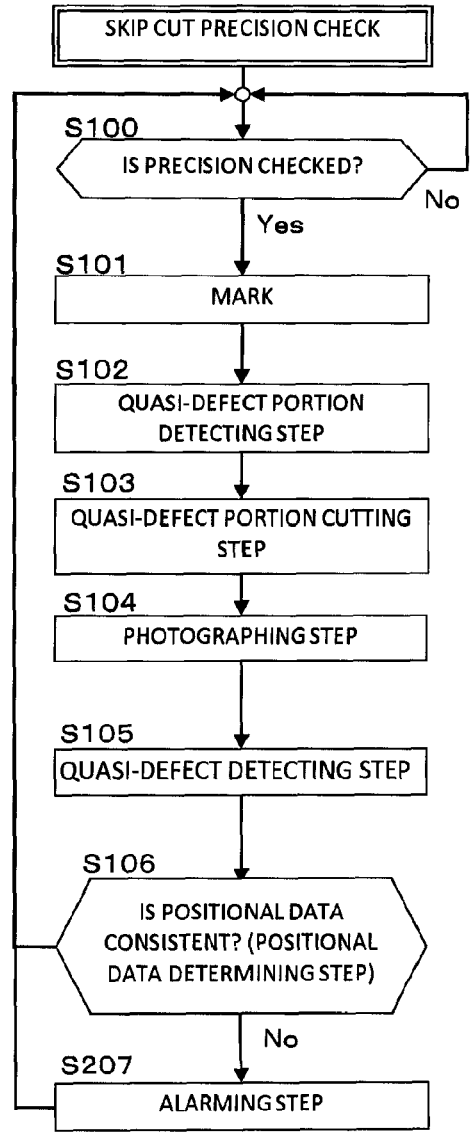
FIG. 16 The figure is a flowchart referred to in order to describe the operation of Example 2.

Next, a description will be made on a skip cut method of Example 3 and a skip cut precision checking processing thereof. FIG. 14 shows a system structure for the skip cut check. FIGS. 15 and 16 are each a flowchart of the skip cut precision checking processing.

First, it is determined whether or not the present time is a predetermined timing (S100). The timing when quasi-defects are attached is the same as in Example 1.

Marking step (position specifying data forming step) (S101): When the present time is the predetermined timing, a quasi-defect is attached before the same defect inspection (first or second inspection step) as described above. The method for forming the quasi-defect is not particularly limited, and the quasi-defect is preferably attached by use of a laser from the viewpoint of the defect size of the quasi-defect, and the control of the size and the position, for example, a control for determining, out of the members, a member onto which the quasi-defect is to be formed. The laser power is varied in accordance with the species of the members of the sheet product, and the quasi-defect can be made on a surface position of the sheet product (first or second sheet product), in the lamination thereof, or the like. About the quasi-defect, the above-mentioned examples of the position specifying data may each be made onto the sheet product by the above-mentioned position specifying data forming means.

After the marking step, the quasi-defect portion marked on the sheet product (first sheet product F1 or second sheet product F2) is defect-detected (inspected) (S102). The detection is a defect-detection made by a defect inspection apparatus (14 or 24). Next, the sheet product (F1 or F2) is fed to a cutting apparatus (16 or 26) and subjected to a cutting processing to exclude the quasi-defect portion (S103). In other words, the quasi-defect is detected by the detect inspection apparatus (14 or 24), and the defect data (quasi-defect data) from the defect inspection apparatus (14 or 24) are transmitted to the controller 1. A cutting processing is then conducted through cutting timing control made by the controller 1. On the basis of the defect data, the cutting apparatus (16, 26) makes a cut of the sheet product (F1 or F2) to exclude the defect. Specifically, the cut is made as follows:

A manufacturing system illustrated in FIG. 14 is formed to have a first feeder 12 for feeding the first sheet product F1 (containing the first optical film F11) from the upstream side to the downstream side in the feeding direction; a marking apparatus 201 for making any quasi-defect; the first defect inspection apparatus 14 for inspecting the quasi-defect; the cutting apparatus for cutting the sheet product; a photographing means 202 (CCD camera) for photographing the cut first sheet product F1; a quasi-defect detecting means 203, which is one function of the controller 1, for detecting the quasi-defect; a positional data determining means 204, which is one function of the controller 1, for determining whether or not the positional data of the quasi-defect detected by the first defect inspection apparatus 14 are consistent with the positional data attached by the marking apparatus 201; a cut position correcting means 205, which is one function of the controller 1 and corresponds to a correcting means, for correcting, when these positional data are not consistent with each other, the cut positions to make the data consistent with each other; and others.

The marking apparatus 201 attaches quasi-defects at regular intervals or at arbitrary times, and the quasi-defects are detected by the first defect inspection apparatus 14.

The first sheet product F1 is fed to the first cutting apparatus 16 by the first feeder 12. The first cutting apparatus 16 has a structure for stopping the first sheet product F1 so as to be cut. For this purpose, an accumulator A is set before the first cutting apparatus 16. By this accumulator A, the detection processing can be conducted without stopping the feeding of the sheet product F1. The first cutting apparatus 16 is controlled to cut the first sheet product into a predetermined length. Determining a positional relationship between the position of any one of the quasi-defects (the coordinates of the inspection area thereof) contained in the transmitted defect data and the next cut position, the apparatus 16 makes a cut. This will be described, using FIG. 17.

Figure 17:
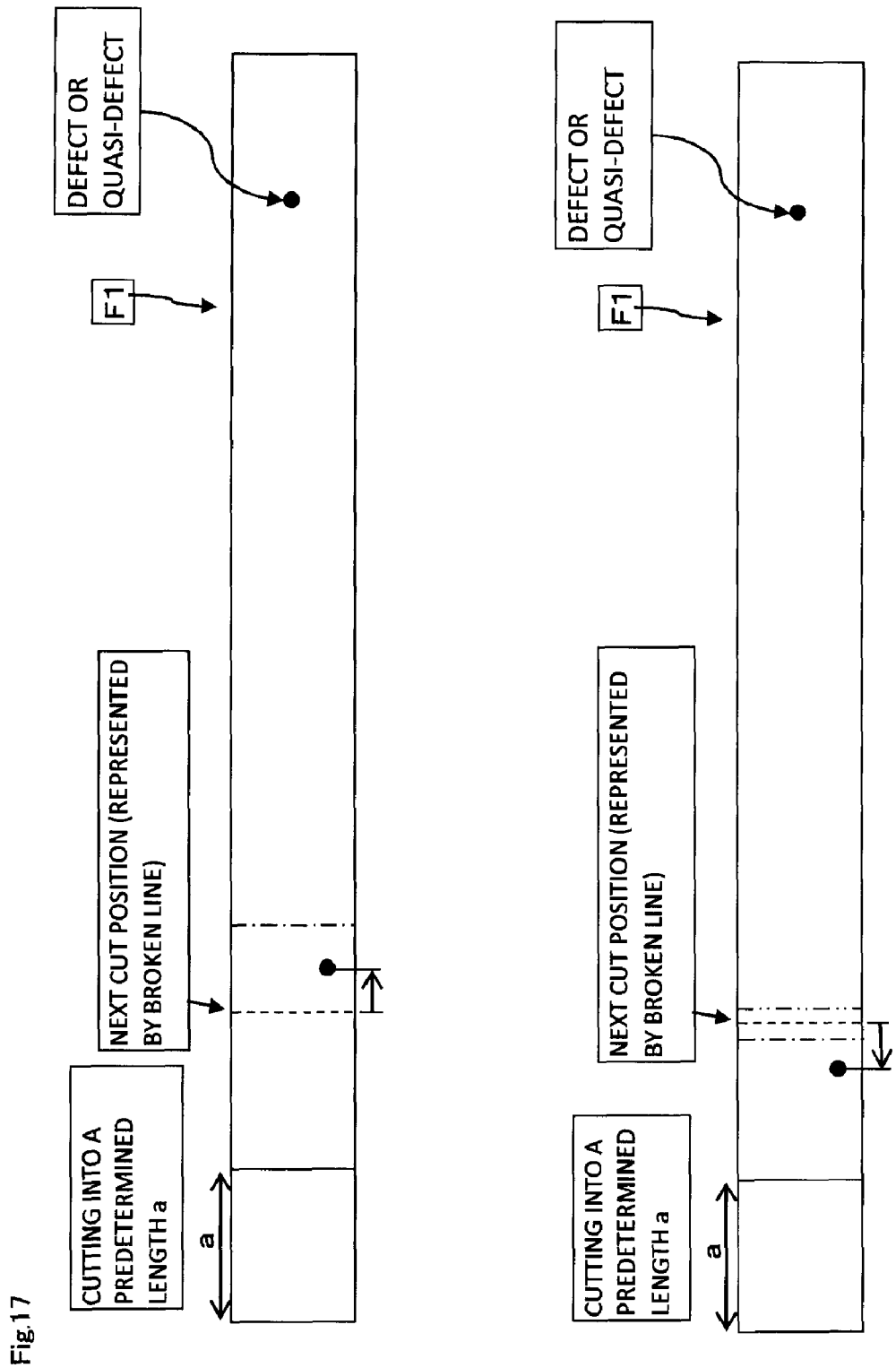
FIG. 17 The figure is a view referred to in order to describe a skip cut method.

FIG. 17 is a view referred to in order to describe an example of a skip cut made while the system is continuously driven. As illustrated in FIG. 17, the long first sheet product F1 is cut into a predetermined length (a). This predetermined length (a) is set in accordance with the bonding size thereof to a liquid crystal panel (optical display substrate).

(A) When a defect or any one of the quasi-defects is present more than 100 mm apart from the next cut position (broken line) toward the upstream side of the position in the feeding direction, the sheet product is determined to be a non-defective product and then subjected to a cutting processing. In other words, the product is cut at the next cut position (broken line). In order to exclude the defect or the quasi-defect, the product is cut at a position 100 mm apart from the defect or the quasi-defect toward the upstream side thereof in the feeding direction (represented by an alternate long and short dash line). The distance "100 mm", which is used as the cut length from the defect or the quasi-defect, is beforehand set in accordance with various apparatus errors, a long-term driving error, the value of a margin, or the like. In the invention, the system is constructed in such a manner that the cut length from the defect or the quasi-defect is set to a small value so as not to need to consider the margin value or so as to make the margin value small and then a defect cut precision can be periodically checked. Thus, the yield ratio of optical films is good. Additionally, there is not a risk that any first pressure-sensitive adhesive attached optical film that contains a defect or a quasi-defect is bonded onto a liquid crystal panel W even when no margin value is considered.

(B) When a defect or any one of the quasi-defects is present 100 mm or less apart from the next cut position (broken line) toward the upstream side of the position in the feeding direction, the sheet product is determined not to be a non-defective product, and then subjected to a cutting processing. Without being cut at the next cut position (broken line), the product is cut at a position 100 mm apart from the defect or the quasi-defect toward the upstream side thereof in the feeding direction (represented by an alternate long and short dash line).

(C) When a defect or any one of the quasi-defects is present more than 100 mm apart from the next cut position (broken line) toward the downstream side of the position in the feeding direction, the sheet product is determined not to be a non-defective product, and then subjected to a cutting processing. Specifically, without being cut at the next cut position (broken line), the product is cut at a position 100 mm apart from the defect or the quasi-defect toward the upstream side thereof in the feeding direction (represented by an alternate long and short dash line) in order to exclude the defect or the quasi-defect.

(D) When a defect or any one of the quasi-defects is present 100 mm or less apart from the position (broken line) toward the downstream side of the position in the feeding direction, the sheet product is determined not to be a non-defective product, and then subjected to a cutting processing. Without being cut at the next cut position (broken line), the product is cut at a position 100 mm apart from the defect or the quasi-defect toward the upstream side thereof in the feeding direction (represented by an alternate long and two short dashes line).

The following will describe a processing for analyzing the quasi-defect-containing cut sheet product.

Photographing step (S104): The cut quasi-defect-containing first sheet product F1 is photographed. In the same manner as the first defect inspection apparatus 14, the photographing means 202 is composed of area sensors, such as CCD cameras, and photographed graphic (image) data are transmitted to the controller 1.

Quasi-defect detecting step (S105): The quasi-defect detecting means 203, which is one function of the controller 1, subjects the graphic (image) data to image processing so as to be analyzed. In this way, the means 203 detects the quasi-defect. The method for the detection, and the precision of the detection are the same as in the defect-detection made by the first defect inspection apparatus 14.

Positional data determining step (S106): The positional data determining means 204 (corresponding to a comparing means), which is one function of the controller 1, determines whether or not the detected positional data of the quasi-defect is consistent with the positional data of the quasi-defect attached by the marking apparatus 201. For example, the image data on the quasi-defect detected by the quasi-defect detecting means 203 (the image data on one of the fractional inspection areas) and the inspection area coordinates thereof are compared with the image data on the defect detected by the first defect inspection means 14 (the image data on one of the fractional inspection areas) and the inspection area coordinates thereof, and it is determined whether or not the these data are consistent with each other. When they are consistent with each other, the present process is returned to the step S100, and then the next command for precision check is awaited. On the other hand, when they are not consistent with each other, the process is advanced to the next step for making a correction of a cut position in order to prevent a risk that the defect or quasi-defect flows out toward the downstream side.

Cut position correcting step (S107): The cut position correcting means 205, which is one function of the controller 1 and corresponds to a correcting means, makes a correction of a cut position to make these positional data consistent with each other. In other words, the means 205 gives a command for making a correction of a cut position to the first cutting apparatus 16 to make the image data on the quasi-defect detected by the quasi-defect detecting means 203 and the inspection area coordinates thereof consistent with the image data on the defect detected by the defect inspection means and the inspection area coordinates thereof. When the position of the quasi-defect detected by the quasi-defect detecting means 203 is shifted, for example, toward the downstream side by two areas (for example, 5 mm×2=10 mm in the feeding direction) out of the inspection areas according to the image analysis, the cut timing is changed to correct the cut position so as to be shifted toward the upstream side by 10 mm. In this way, the image data on the quasi-defect detected by the quasi-defect detecting means 203 and the inspection area coordinates thereof are made consistent with the image data on the defect detected by the defect inspection means and the inspection area coordinates thereof. As a result, any defect- or quasi-defect-containing, pressure-sensitive adhesive attached optical film can be excluded with accuracy. According to the above-mentioned operation, in the case of carrying out a processing of bonding a pressure-sensitive adhesive attached optical film and an optical display substrate onto each other continuously, any defect can be automatically excluded with a high precision.

The above-mentioned deviation of the quasi-defect position may be generated in proportion to long-term driving of the individual apparatuses; thus, the controller 1 memorizes a deviation amount per hour for the driving. When a tendency thereof is determined, it is allowable to make an intelligent control for correcting the deviation amount automatically for each of the driving hours.

Another embodiment may have an alarming step (FIG. 16, S207) instead of or in addition to the cut position correcting step, the alarming step being made by an alarming apparatus (not illustrated) for a warning sound, a warning voice, the lighting or flashing of an alarm lamp, an alarm display, or the like when the positions of the above-mentioned quasi-defects are not consistent with each other.

(Embodiments of Precision Check)

In the case of checking the precision of the defect inspection apparatuses, the feeders, the cutting apparatuses, the controller and so on, the following operation is given as an example: First, quasi-defects are attached by the marking apparatus 201, for example, at regular intervals, or at arbitrary times. The quasi-defects are defected by the first defect inspection apparatus 14. It is preferred that each of the defects is attached to the surface and the defect can be perceived with the naked eye also. Any one of the inspection areas of the first defect inspection apparatus 14 is set to, for example, 25 mm$^2$=5 mm in the film feeding direction×5 mm in the film width direction. The data on the quasi-defects are composed of, for example, the kinds, the sizes, the numbers, the inspection area coordinates, and the identification numbers of the quasi-defects, and image data of the inspection areas. The quasi-defect data are associated with the image data photographed by the first defect inspection apparatus 14. The quasi-defect data are transmitted to the controller 1.

The controller 1 commands a cutting timing to the first cutting apparatus 16 in the same way as in the above-mentioned operation. This cutting timing is set in such a manner that the precision of the cutting processing of any one of the quasi-defect portions can be precisely checked. For example, the setting is a setting which permits a cut at a distance of 100 mm from the detect position as a center toward the upstream side and at a distance of 100 mm therefrom toward the downstream side. According to this, it is theoretically assumed that the quasi-defect defected by the first defect inspection apparatus 14 is present at the central position (the position giving a length of 100 mm) of the first sheet product F1 cut into a length of 200 mm in the feeding direction. However, it is presumed that the position of the quasi-defect is present to be deviated, from the length-central position of the first sheet product F1 in the feeding direction thereof, by various apparatus errors, a control error, and others. The present embodiment has a structure wherein this deviation amount can be measured, the skip cut precision can be checked and further a cut position is corrected to restrain the deviation amount into a specified range.

Figure 18:
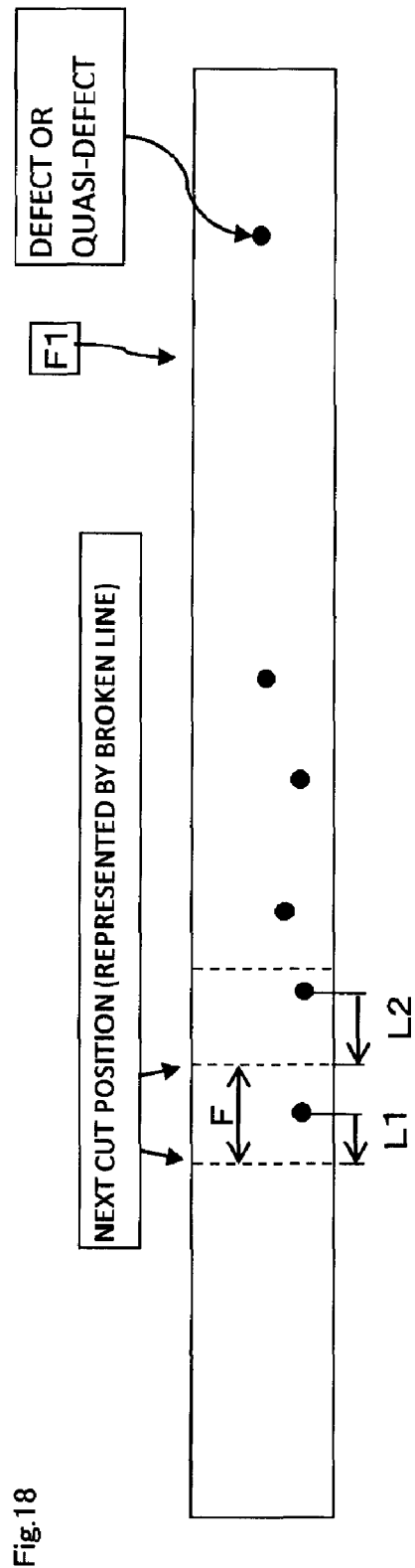
FIG. 18 The figure is a view referred to in order to describe the precision check of a skip cut.

According to Example 3, the first sheet product F1 cut into a length of 200 mm (corresponding to F in FIG. 18) along the feeding direction is photographed by the photographing means 202, and then the image is subjected to image processing and analysis by the quasi-defect detecting means 203, so as to detect any one of the attached quasi-defects. When the defect can be perceived with the naked eye also, it can easily be checked by viewing the cut first sheet product F1 whether or not the quasi-defect is present at the center of the first sheet product F1 in the feeding direction thereof. The present embodiment has a structure wherein the cut first sheet product F1 is photographed by the photographing means 202 and then the image is analyzed so that any quasi-defect can be automatically detected. The quasi-defect detecting means 203 measures the distance between the central portion of the detected quasi-defect and the cut face (end) in the feeding direction. When the measured distance (corresponding to the length L1 or L2 in FIG. 18) is in the range of 40 to 60% of the length of the cut first sheet product F1, i.e., 200 mm, it is determined that the quasi-defect is present at the central portion of the cut first sheet product F1, so that it is determined that the positional data of the detected quasi-defect is consistent with the positional data of the quasi-defect attached by the marking apparatus 201. The "range of 40 to 60% of the length, i.e., 200 mm" is an example, and the range may be changed in accordance with the structure of the apparatus system, the feed distance, the area of each of the inspection areas, and others. For example, the range may be set into a range of 45 to 55% thereof, or a range of 30 to 70% thereof.

On the other hand, when the measured distance is not in the range of 40 to 60% of 200 mm, it is determined that no quasi-defect is present at the central portion of the skip cut of the cut first sheet product F1, so that it is determined that the detected positional data of the quasi-defect is not consistent with the positional data of the quasi-defect attached by the marking apparatus 201. A correction of the cut position (correction of the cutting timing) is then made as describe above. When L1 is a length of 45% of F In FIG. 18, it is determined that a defect or the quasi-defect is preset at the central portion of the sheet in the feeding direction thereof (or is not deviated). When L2 is a length of 70% of F, it is determined that no defect or quasi-defect is preset at the central portion of the sheet in the feeding direction thereof (or is deviated).

The controller 1 may be realized by a cooperation action of a software program and hardware resources such as a CPU and a memory. In this case, the program software, a processing routine, various settings, and others are beforehand memorized in a memory. The controller 1 may be made of a dedicated circuit, a firmware, or the like. The controller 1 may be composed of plural computers (including, in a conception thereof, a personal computer and a microcomputer), and the computers may be arranged in the defect inspection apparatuses (14 and 24), the cutting apparatuses (16 and 26), the feeders (12 and 22), the accumulators A, and so on, respectively.

According to the above-mentioned embodiment, it can be periodically inspected whether or not any skip cut is precisely made. Moreover, defect portions can be certainly excluded, considering various apparatus errors in the manufacturing system, for example, in the defect inspection apparatuses, the optical film feeders and the cutting apparatuses, control errors, mechanical errors generated at the time of continuous and stopping driving thereof, and other errors. Additionally, even when the errors are varied by, for example, the driving over a long term, any cut position is automatically corrected. Thus, it is not feared that an optical film containing no defect is also excluded in vain. Thus, the yield ratio of optical films can be largely improved.

In a case where the manufacturing method of the invention has the alarming step, an alarm is issued to an operator through a warning sound, a warning lamp or the like when the errors are varied by, for example, the driving over a long-term so that the quasi-defects are not precisely excluded. Thus, the operator can know that the errors become large. In this way, the operator can analyze a fluctuation in the errors of the manufacturing system, and can make effective use of the resultant analysis data for the adjustment or the maintenance of the apparatuses, or the like.

In Examples 1 to 3 described above, the marking processing is conducted in the manufacturing system. However, the quasi-defect forming manner is not limited thereto. For example, quasi-defects may be made in a line for producing the material roll of the first sheet product.

(Skip Cut in Another Embodiment)

Another embodiment of the above-mentioned first and second cutting steps will be described hereinafter. This embodiment is particularly effective for a case where the manufacturing method of the invention neither has the above-mentioned first nor second inspection step. There is a case where at a predetermined pitch (for example, 1000 mm), defect data about the first or second sheet product (such as the coordinates of the inspection areas thereof, the kinds of defects, and the sizes thereof) are attached, as a code data (such as a QR code or a bar code), onto one of the end regions in the width direction of each of the first and second material rolls. In such a case, before the sheet product is cut, this code data is read and analyzed, and then the sheet product is cut into a predetermined size in the first or second cutting step so as to avoid any defect portion. In this case, an apparatus for reading the code data, and a apparatus for the analysis correspond to a defect detecting apparatus.

Embodiment 2

Figure 2:
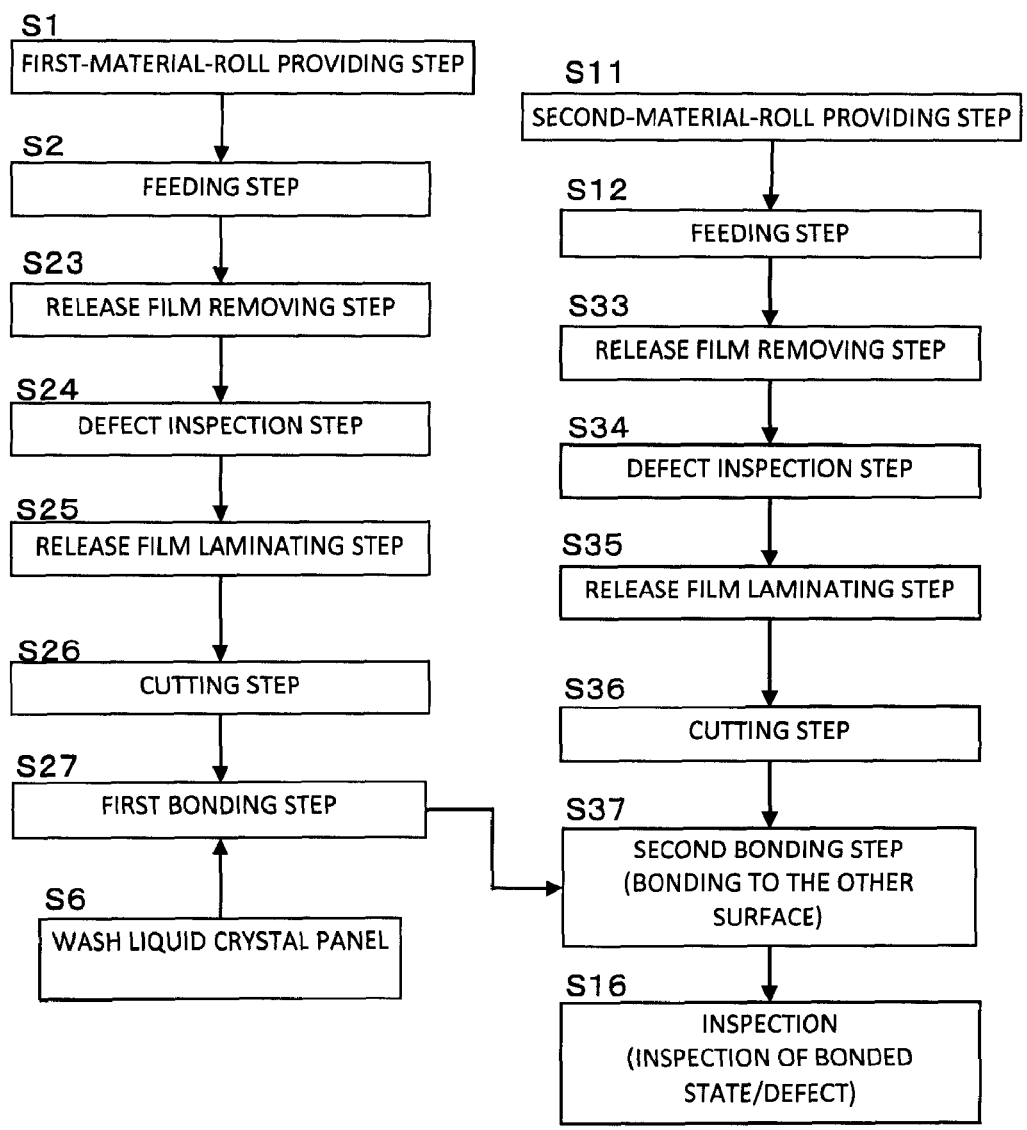
FIG. 2 The figure is a flowchart of an optical display unit manufacturing method of Embodiment 2.
Figure 4:
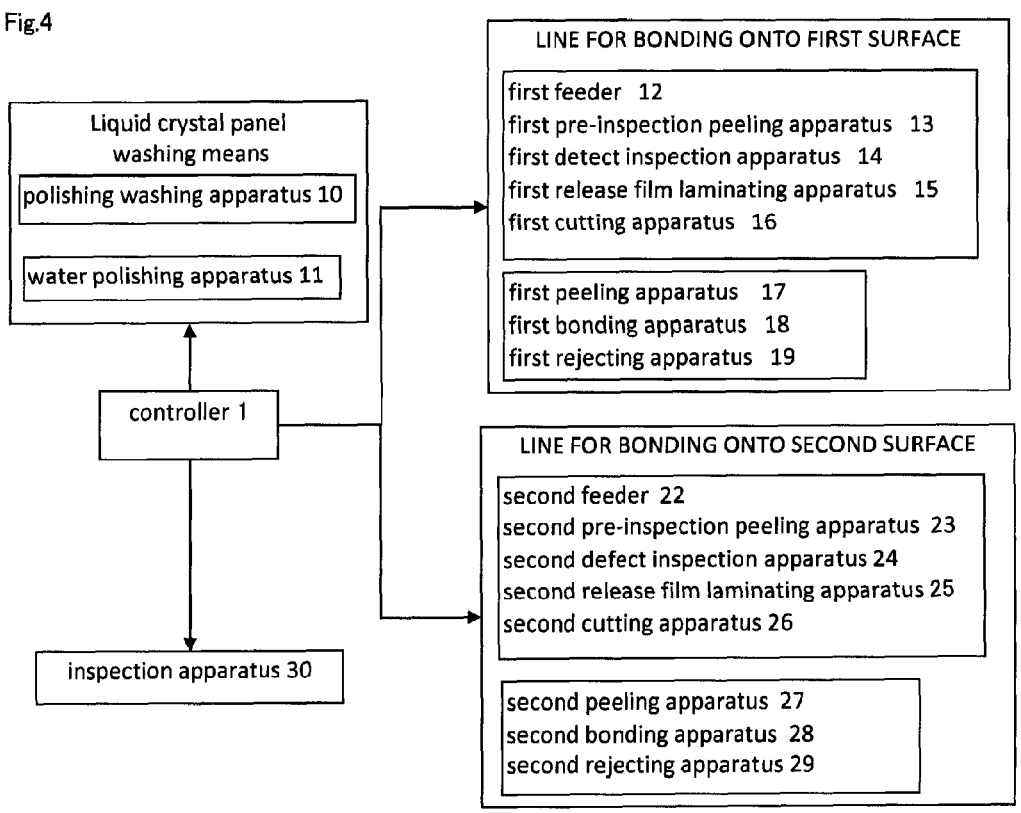
FIG. 4 The figure is a view referred to in order to describe a manufacturing system of Embodiment 2.

Embodiment 2 of the invention will be described hereinafter. FIG. 2 shows a flowchart of a method of Embodiment 2 for manufacturing an optical display unit. FIG. 4 shows the structure of an optical display unit manufacturing system in Embodiment 2. About each of the same processings as in Embodiment 1, any description thereof will be omitted, or a brief description will be made.

A first-material-roll providing step (FIG. 2, S1) and a feeding step (FIG. 2, S2) are the same as in Embodiment 1.

Release film removing step (FIG. 2, S23): A first pre-inspection peeling apparatus 13 peels the release film F12 (H11 in FIG. 5) from the first sheet product F1 which is being fed. Details of a mechanism for the peeling will be described later.

First defect inspection step (FIG. 2, S24): After the release film removing step, a first defect inspection apparatus 14 inspects any defect of the first sheet product F1 (made substantially of the first optical film F11 and the first pressure-sensitive adhesive layer F14). Without needing to consider a retardation which exists in the release film F12, defect inspection is made about the optical film F11 and the first pressure-sensitive adhesive layer F14. The method for the defect inspection is as described above. The first pressure-sensitive adhesive attached optical film (first optical film F11 and first pressure-sensitive adhesive F14) which is a defect-containing, first pressure-sensitive adhesive attached optical film is rejected by a first rejection apparatus 19, which will be described later, and the film is not bonded onto any liquid crystal panel W.

Release film laminating step (FIG. 2, S25): After the first defect inspection step, a first release film laminating apparatus 15 laminates a release film F12a (see FIG. 5) onto the first optical film F11 through the first pressure-sensitive adhesive layer F14. Details of the first release film laminating apparatus 15 will be described later.

First cutting step (FIG. 2, S26): After the release film laminating step, a first cutting apparatus 16 next makes a cut of the surface protecting film F13, the pressure-sensitive adhesive layer F15, the first optical film F11 and the first pressure-sensitive adhesive layer F14 other than the release film F12a into a predetermined size.

First bonding step (FIG. 2, S27): After the first cutting step, a first peeling apparatus 17 next peels the release film F12a. A first bonding apparatus 18 bonds the first pressure-sensitive adhesive attached optical film (containing the surface protecting film F13 and the pressure-sensitive adhesive layer F15) from which the release film F12 has been peeled off onto a liquid crystal panel W through the first pressure-sensitive adhesive layer F14. At the time of the bonding, the first pressure-sensitive adhesive attached optical film and the liquid crystal panel W are sandwiched between rolls, so as to be bonded to each other under pressure, which will be described later.

A second-material-roll providing step (FIG. 2, S11) and a feeding step (FIG. 2, S12) are the same as in Embodiment 1.

Release film removing step (FIG. 2, S33): A second pre-inspection peeling apparatus 23 peels the release film F22 (H21 in FIG. 7) from the second sheet product F2 which is being fed. Details of a mechanism for the peeling will be described later.

Second defect inspection step (FIG. 2, S34): After the release film removing step, a second defect inspection apparatus 24 inspects any defect of the second sheet product F2 (made substantially of the second optical film F21 and the second pressure-sensitive adhesive layer F24). Without needing to consider a retardation existing in the release film F22, nor an contaminant, a scratch or any other defect that adheres to or exists in the release film. F22, defect inspection can be made about the second optical film F21 and the second pressure-sensitive adhesive layer F24. The method for the defect inspection is as described above. The second pressure-sensitive adhesive attached optical film (the second optical film F21 and the second pressure-sensitive adhesive layer F24) which is a defect-containing second pressure-sensitive adhesive attached optical film is rejected by a second rejection apparatus 29, which will be described later, and will not be attached to any liquid crystal panel W1.

Release film laminating step (FIG. 2, S35): After the second inspection step, a second release film laminating apparatus 25 laminates a release film F22a (see FIG. 7) onto the second optical film F21 through the second pressure-sensitive adhesive layer F24. Details of the second release film laminating apparatus 25 will be detailed.

Second cutting step (FIG. 2, S36): After the release film laminating step, a second cutting apparatus 26 next makes a cut of the surface protecting film F23, the pressure-sensitive adhesive layer F25, the second optical film F21 and the second pressure-sensitive adhesive layer F24 other than the release film F22a into a predetermined size.

Second bonding step (FIG. 2, S37): After the second cutting step, a second peeling apparatus 27 next peels the release film F22a. A second bonding apparatus 28 bonds, through the second pressure-sensitive adhesive layer F24 thereof, the second pressure-sensitive adhesive attached optical film (containing the surface protecting film F23 and the pressure-sensitive adhesive layer F25), from which the release film F22a has been peeled off, onto a surface of the liquid crystal panel W1 which is different from the surface of the panel W1 on which the first optical film F11 is bonded. The above-mentioned steps make it possible to manufacture a liquid crystal panel W12 wherein the first pressure-sensitive adhesive attached optical film is bonded on one of the surfaces of the liquid crystal panel W, the second pressure-sensitive adhesive attached optical film is bonded on the other surface, and the optical films are laid onto both the surfaces, respectively.

(Manufacturing System Favorable for Realizing the Manufacturing Method of Embodiment 1 or 2)

Figure 5:
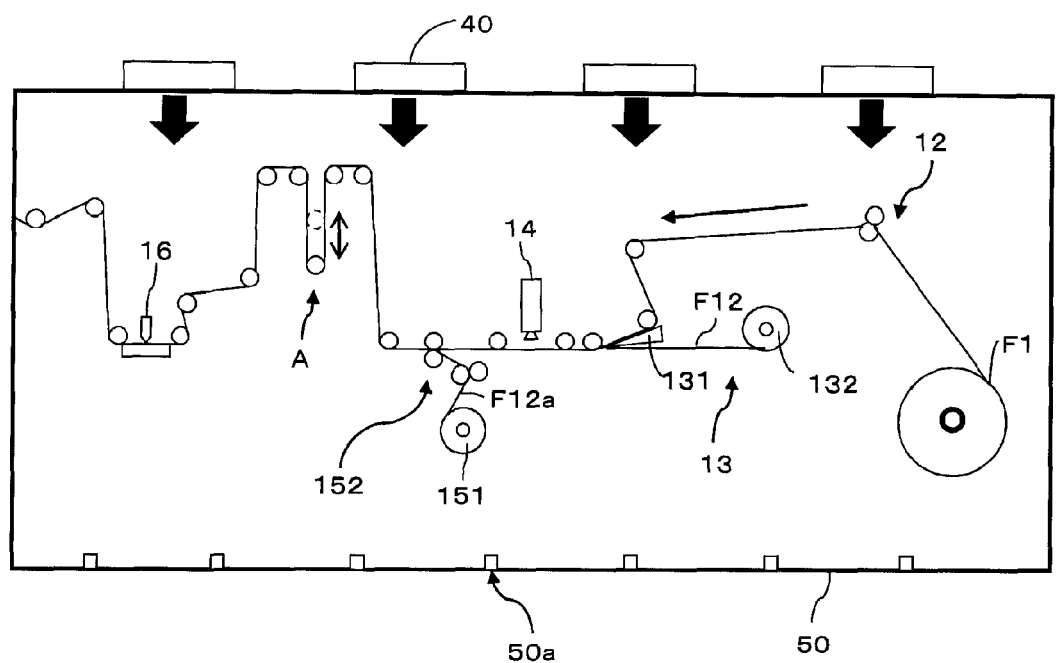
FIG. 5 The figure is a view referred to in order to describe the apparatus structure of the manufacturing system of Embodiment 2.

The following will describe an example of a manufacturing system favorable for realizing the manufacturing method of Embodiment 2. FIG. 5 is a view illustrating the first feeder 12, the first pre-inspection peeling apparatus 13, the first defect inspection apparatus 14, the first release film laminating apparatus 15 and the first cutting apparatus 16.

Figure 6:
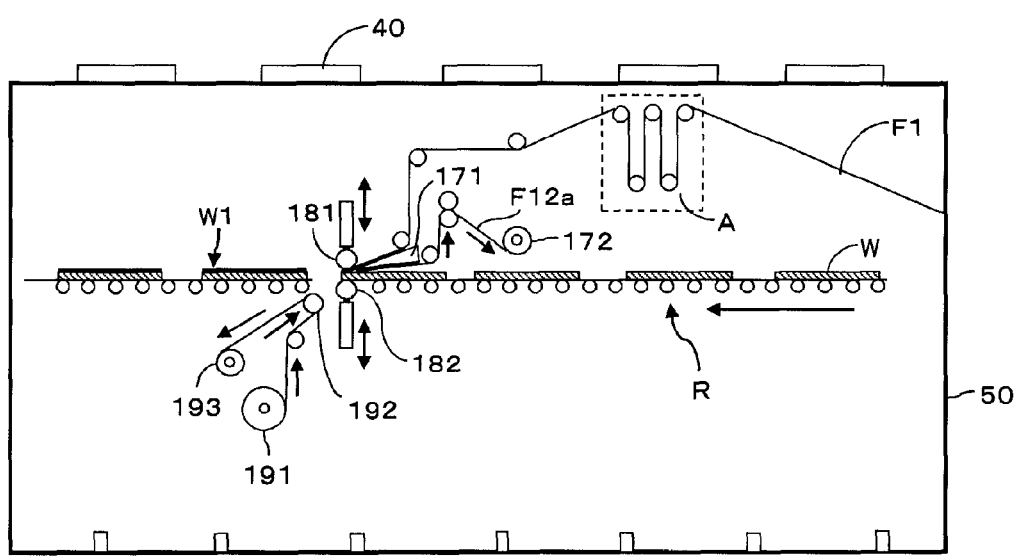
FIG. 6 The figure is a view referred to in order to describe the apparatus structure of the manufacturing system of Embodiment 2.
Figure 7:
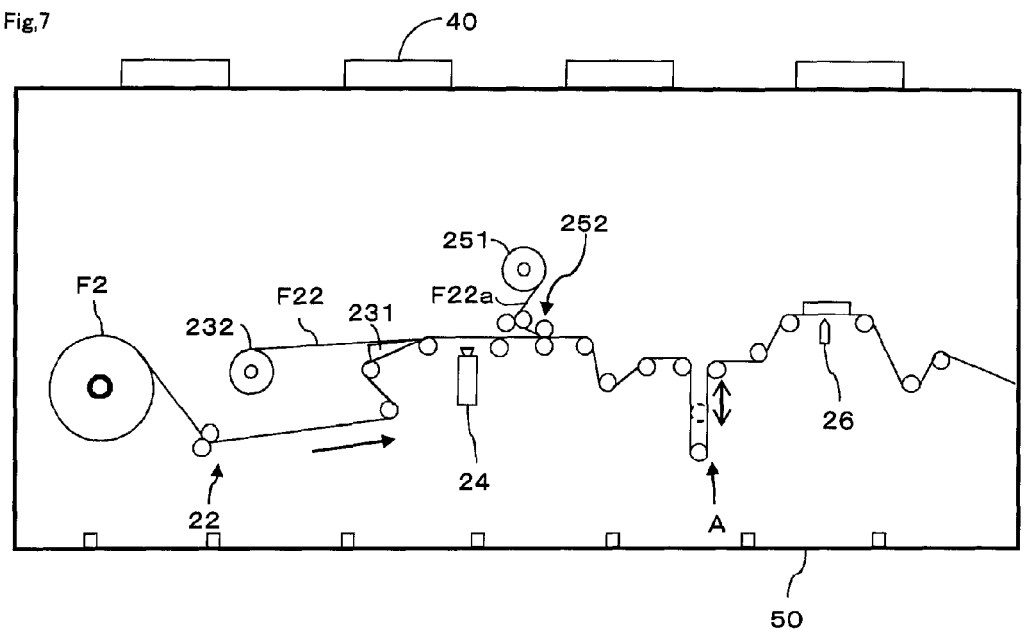
FIG. 7 The figure is a view referred to in order to describe the apparatus structure of the manufacturing system of Embodiment 2.
Figure 8:
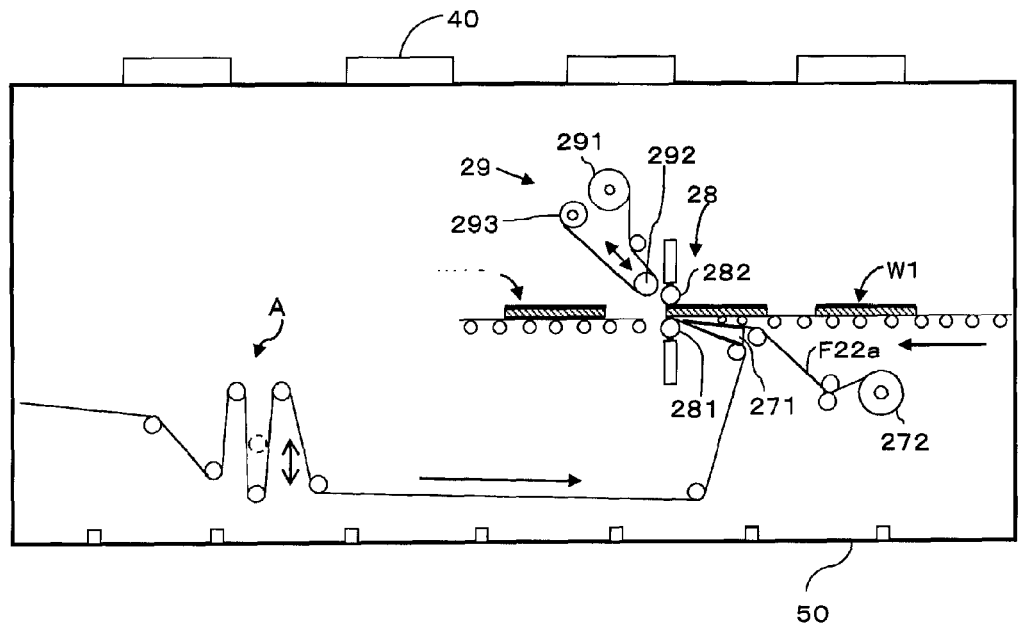
FIG. 8 The figure is a view referred to in order to describe the apparatus structure of the manufacturing system of Embodiment 2.

FIG. 6 is a view illustrating the first peeling apparatus 17, the first bonding apparatus 18, and the first rejection apparatus 19. FIG. 7 is a view illustrating the second feeder 22, the second pre-inspection peeling apparatus 23, the second defect inspection apparatus 24, the second release film laminating apparatus 25 and the second cutting apparatus 26. FIG. 8 is a view illustrating the second peeling apparatus 27, the second bonding apparatus 28, and the second rejection apparatus 29.

The individual apparatuses are isolated from the outside by an isolated equipment 50. The inside surrounded by the isolated equipment 50 is kept cleaner than the outside. The isolated equipment 50 is composed of walls made of a transparent material, and a frame structure. A blower 40 is set on the ceiling of the isolated equipment 50. The blower 40 is equipped with an HEPA filter, and blows air high in cleanliness into the isolated equipment 50. Air discharging openings 50a for discharging inside air to the outside are made in the lower of the wall faces of the isolated equipment 50. In order to prevent invaders from the outside, filters may be fitted to the openings. The isolated equipment 50 and the blower 40 make it possible to keep the whole of the manufacturing system a clean environment to prevent the invasion of contaminants from the outside appropriately. Moreover, it is unnecessary to render the whole of the factory the so-called clean room since only the manufacturing system is isolated from the outside by the isolated equipment 50.

The above-mentioned polishing cleaning apparatus 10 polishes both surfaces of a liquid crystal panel W through its polishing means (not illustrated), thereby making it possible to remove surface-adhesion contaminants to clean the panel. Examples of the adhesion contaminants include fine pieces of glass, and fiber pieces. The water cleaning apparatus 11 is formed to clean both the surfaces of the liquid crystal panel W with water by use of a brush, and then dry the surfaces.

The following will describe FIG. 5 to FIG. 8 in turn. A first material roll of a long first sheet product F1 is set to a roll mount apparatus movable to be linked with a motor or the like so as to be freely rotated or rotated at a specified rotation speed. By the controller 1, the rotation speed is set and the mount apparatus is controlled to be driven.

The first feeder 12 is a feeding mechanism for feeding the first sheet product F1 toward the downstream side. The first feeder 12 is controlled by the controller 1.

The first pre-inspection peeling apparatus 13 has a structure wherein the release film F12 is peeled off from the fed first sheet product F1 and then wound up around a roll 132. The winding-up rate to the roll 132 is controlled by the controller 1. Its peeling mechanism 131 has a knife edge region having a sharp tip, and is formed in such a manner that the direction of the feeding of the release film F12 is turned in the state that the release film F12 is wound and caught at the knife edge region, thereby peeling the release film F12 and further the first sheet product F1 from which the release film F12 has been peeled off is fed into the feeding direction.

The first defect inspection apparatus 14 makes an defect inspection after the release film F12 is peeled off. The first defect inspection apparatus 14 analyzes image data photographed by use of CCD cameras to detect any defect or quasi-defect, and further calculates the position coordinates thereof. The position coordinates of the defect are supplied to a skip cut made by the first cutting apparatus 16, which will be described later. The constitution of the defect inspection made by the first defect inspection apparatus 14 is as described above.

The first release film laminating apparatus 15 laminates a release film F12a newly onto the first optical film F11 through the first pressure-sensitive adhesive layer F14 after the first defect inspection. As illustrated in FIG. 5, the release film F12a is rolled out from a material roll 151 of the release film F12a, and then the release film F12a and the first optical film F11 are sandwiched between one or more roller pairs 152, so that the roller pairs 152 cause a predetermined pressure to act thereon, thereby bonding the films onto each other. The rotation speed of the roller pairs 152, the pressure, and the feeding are controlled by the controller 1.

After the laminating of the release film F12a, the first cutting apparatus 16 makes a half cut of the surface protecting film 15, the first optical film F11, the first pressure-sensitive adhesive layer F14, and the pressure-sensitive adhesive layer F15 other than the release film F12a into a predetermined size. The cutting timing is, for example, according to a constitution wherein a command is issued from the controller 1 as descried above. In this case, defect data are transmitted to the first cutting apparatus 16. The first cutting apparatus 16 makes a half cut of the first sheet product F1 into a predetermined size (a) to avoid any defect portion (including any quasi-defect). In other words, the cut product which is a defect-portion-containing cut product will be rejected as a defective product by the first rejection apparatus 19 in a subsequent step. Alternatively, the first cutting apparatus 16 may ignore the existence of the defects and make a continuous cut of the first sheet product F1 into a predetermined size. In this case, in a bonding processing that will be described later, the portions concerned may be removed without being bonded to any panel. The control in this case is also based on a function of the controller 1.

The first cutting apparatus 16 is equipped with a holding table for adsorbing and holding the first sheet product F1 from the rear surface thereof, and has a laser over the first sheet product F1. The apparatus 16 is shifted in parallel to scan a laser ray on the first sheet product F1 along the width direction thereof, and makes a half cut of the first pressure-sensitive adhesive layer F14, the first optical film F11, the surface protecting film F13, and the pressure-sensitive adhesive layer F15 other than the release film F12a at the lowest position along the feeding direction thereof at a predetermined pitch. This laser preferably has a structure wherein air nozzles, between which the first sheet product F1 is sandwiched along the width direction so that hot wind is blown into a cutting region, are integrated with a fume collecting duct for collecting a gas (fume) generated from the cut region and fed by the hot wind in the state that the nozzles are opposed to the duct. When the first sheet product F1 is adsorbed by the holding table, the accumulator A of the feeding mechanism is formed to be moved up and down in the vertical direction so as not to stop a continuous feeding of the downstream side region of the first sheet product F1 and the upstream side region thereof. This action is also controlled by the controller 1.

After the cutting processing, the first bonding apparatus 18 bonds the first pressure-sensitive adhesive attached optical film (containing at least the first optical film F11 and the first pressure-sensitive adhesive layer F14), from which the release film F12a has been peeled off by the first peeling apparatus 17, to a liquid crystal panel W through the first pressure-sensitive adhesive layer F14.

As illustrated in FIG. 6, the bonding is performed while the first pressure-sensitive adhesive attached optical film is brought into contact with a surface of the liquid crystal panel W under pressure by means of a press roller 181 and a guide roller 182. The pushing pressure between the press roller 181 and the guide roller 182, and the driving actions thereof are controlled by the controller 1.

A peeling mechanism 171 of the first peeling apparatus 17 has a knife edge region having a sharp tip, and is formed in such a manner that the direction of the feeding of the release film F12a is turned in the state that the release film F12a is wound and caught at the knife edge region, thereby peeling the release film F12a and further the first optical film F11 from which the release film F12a has been peeled off is fed into the liquid crystal panel W surface. At this time, the bonding precision of the first optical film F11 can be improved by applying a tension of 100 N/m or more and 1000 N/m or less to the release film F12a and/or setting the period from the peeling of the release film F12a from the first optical film F11 to the contact of the film F11 with the liquid crystal panel W surface under pressure to 3 seconds or less. If the tension is smaller than 100 N/m, the feeding position of the first optical film is not stable. If the tension is larger than 1000 N/m, it is feared that the release film F12a is elongated to be broken. If the period up to the contact under pressure is longer than 3 seconds, edge portions of the first optical film peeled off from the release film F12a are curved so that the portions are broken or air bubbles are generated therefrom. The peeled release film F12a is wound up around a roll 172. The winding around the roll 172 is controlled by the controller 1.

The mechanism for the bonding is composed of a press roller 181 and a guide roller 182 arranged to be opposed thereto. The guide roller 182 is made of an elastic roller driven rotatably by means of a motor, and is arranged to be movable upward and downward. Just above the roller 182, the press roller 181, which is made of an elastic roller driven rotatably by means of a motor, is arranged to be movable upward and downward. When the liquid crystal panel W is fed into a bonding position, the press roller 181 is moved upward to a position higher than the upper surface of the panel, so that an interval is made between the rollers. The guide roller 182 and the press roller 181 may each be a rubbery roller, or a metallic roller. The liquid crystal panel W is cleaned by the various cleaning apparatuses in a way as described above, and fed by the feeding mechanism R. The feeding according to the feeding mechanism R is also controlled by the controller 1.

The first rejection apparatus 19 is described, which is for rejecting the first sheet product F1 containing any defect. When the defect-containing first sheet product F1 is fed to the bonding position, the guide roller 182 is shifted downward in the vertical direction. Next, a roller 192 around which a pressure-sensitive adhesive tape 191 is wound is shifted to a fixed position of the guide roller 182. The press roller 181 is shifted downward in the vertical direction to cause a surface of the defect-containing first pressure-sensitive adhesive attached optical film (containing the surface protecting film F13 and the pressure-sensitive adhesive layer F15) to be pushed against the pressure-sensitive adhesive tape 191 so as to bond the first pressure-sensitive adhesive attached optical film onto the pressure-sensitive adhesive tape 191. The defect-containing first pressure-sensitive adhesive attached optical film is then wound up around a roller 193, together with the pressure-sensitive adhesive tape 191.

The liquid crystal panel W1 produced as described above is fed toward the downstream side, and then a second optical film F21 is bonded thereon. In the following description, about each of the same apparatus structures, a brief description will be made.

When the second optical film F21 is bonded to satisfy the 90° relationship (crossed nicols relation) between the film and the first optical film F11, the liquid crystal panel W1 is rotated at 90° by the feeding direction switching mechanism of the feeding mechanism R and then the second optical film F21 is bonded thereto. In a method for bonding the second sheet product F2 which will be described below, individual steps are conducted in the state that the second sheet product F2 is reversed (the release film is turned upward), so that the second optical film. F21 is bonded onto the liquid crystal panel W1 from the lower side thereof.

As illustrated in FIG. 7, the second feeder 22 is a mechanism for feeding the second sheet product F2 toward the downstream side. The second feeder 22 is controlled by the controller 1.

The second pre-inspection peeling apparatus 23 peels off the release film F22 from the fed second sheet product F2, and winds up the release film F22 around a roll 232. The rate of the winding around the roll 232 is controlled by the controller 1. Its peeling mechanism has a knife edge region having a sharp tip, and is formed in such a manner that the direction of the feeding of the release film F22 is turned in the state that the release film F22 is wound and caught at the knife edge region, thereby peeling off the release film. F12 and further the second sheet product F2 from which the release film F22 has been peeled off is fed into the feeding direction.

After the release film F22 is peeled off, the second defect inspection apparatus 24 makes a defect inspection. The second defect inspection apparatus 24 analyzes image data photographed by the CCD cameras, detects any defect, and further calculates the position coordinates thereof. The position coordinates of the defect are supplied for a skip cut made by the second cutting apparatus 26, which will be described later.

After the second defect inspection, the second release film laminating apparatus 25 laminates a release film F22a onto the second optical film F21 through the second pressure-sensitive adhesive layer F24. As illustrated in FIG. 7, the release film F22a is rolled out from a material roll 251 of the release film F22a, and then the release film F22a and the second optical film F21 are sandwiched between one or more roller pairs 252, so that the roller pair(s) 252 cause(s) a predetermined pressure to act thereon, thereby laminating the films onto each other. The rotation speed of the roller pairs 252, the pressure, and the feeding are controlled by the controller 1.

After the laminating of the release film F22a, the second cutting apparatus 26 makes a half cut of the surface protecting film F23, the pressure-sensitive adhesive layer F25, the second optical film F21, and the second pressure-sensitive adhesive layer F24 other than the release film F22a into a predetermined size. The second cutting apparatus 26 is, for example, a laser. On the basis of the position coordinates of the defects detected by the second defect inspection processing, the second cutting apparatus 26 cuts the films and the layers into the predetermined size to avoid the defect portions. In other words, the cut product which is a defect-portion-containing cut product will be rejected as a defective product by the second rejection apparatus 29 in a subsequent step. Alternatively, the second cutting apparatus 26 may ignore the existence of the defects and make a continuous cut of the second sheet product F2 into a predetermined size. In this case, in a bonding processing that will be described later, the portions concerned may be removed without being bonded to any panel. The control in this case is also based on a function of the controller 1.

The second cutting apparatus 26 is equipped with a holding table for adsorbing and holding the second sheet product F2 from the rear surface thereof, and has a laser over the second sheet product F2. The apparatus 26 is shifted in parallel to scan a laser ray on the second sheet product F2 along the width direction thereof, and makes a half cut of the surface protecting film F23, the pressure-sensitive adhesive layer F25, the second optical film F21, and the second pressure-sensitive adhesive layer F24 other than the release film F22a at the lowest position along the feeding direction thereof at a predetermined pitch. When the second sheet product F2 is adsorbed by the holding table, the accumulator A of the feeding mechanism is formed to be moved upward and downward in the vertical direction so as not to stop a continuous feeding of the downstream side region of the second sheet product F2 and the upstream side region thereof. This action is also controlled by the controller 1.

After the cutting processing, the second bonding apparatus 28 bonds the second pressure-sensitive adhesive attached optical film (containing the surface protecting film F23 and the pressure-sensitive adhesive layer F25), from which the release film F22a has been peeled off by the second peeling apparatus 27, to the liquid crystal panel W1 through the second pressure-sensitive adhesive layer F24. As illustrated in FIG. 8, the bonding is performed while the second pressure-sensitive adhesive attached optical film is brought into contact with a surface of the liquid crystal panel W1 under pressure by means of a press roller 281 and a guide roller 282. The pushing pressure between the press roller 281 and the guide roller 282, and the driving actions thereof are controlled by the controller 1.

The second peeling apparatus 27 and the second bonding apparatus 28 are equivalent in functional structure to the first peeling apparatus 17 and the first bonding apparatus 18.

The second rejection apparatus 29 for rejecting the second sheet product F2 containing a defect is described. When the defect-containing second sheet product F2 is fed to the bonding position, the guide roller 282 is shifted downward in the vertical direction. Next, a roller 292 around which a pressure-sensitive adhesive tape 291 is wound is shifted to a fixed position of the guide roller 282. The press roller 281 is shifted upward in the vertical direction to cause the defect-containing second pressure-sensitive adhesive attached optical film (containing the surface protecting film F23 and the pressure-sensitive adhesive layer F25) to be pushed against the pressure-sensitive adhesive tape 291 so as to bond the second pressure-sensitive adhesive attached optical film onto the pressure-sensitive adhesive tape 291. The defect-containing second pressure-sensitive adhesive attached optical film is then wound up around a roller 293, together with the pressure-sensitive adhesive tape 291.

The liquid crystal panel W12 on which the first and second optical films F11 and F12 are laid is fed to the inspection apparatus 30. The inspection apparatus 30 inspects both surfaces of the fed liquid crystal panel W12. Examples of the contents to be inspected include surface contaminants and stains of the optical films, and contaminants, air bubbles, damages and stains inside the laminated films. The apparatus 30 is made of a known reflection inspection means or transmission inspection means, or the like.

The operation timing of each of the apparatuses is calculated by, for example, a method of arranging a sensor at a predetermined position and making a detection, or calculated by detecting a rotary member of the feeder (12 or 22) or the feeding mechanism R through a rotary encoder or the like.

The above-mentioned manufacturing system has a structure for bonding the first pressure-sensitive adhesive attached optical film onto the liquid crystal panel W from the upper surface thereof, and then bonding the second pressure-sensitive adhesive attached optical film onto the liquid crystal panel W from the lower surface thereof. The bonding structure in the invention is not limited to this bonding structure, and may have a structure for bonding the first pressure-sensitive adhesive attached optical film onto the liquid crystal panel W from the lower surface thereof, and then bonding the second pressure-sensitive adhesive attached optical film onto the liquid crystal panel W from the upper surface thereof.

(Another Embodiment of the Defect Inspection Method)

An automatic inspection apparatus for realizing defect inspection is an apparatus for inspecting defects, which may be referred to as faults, of a sheet-form product, and radiating light thereon, gaining a reflected light image or transmitted light image thereof through a photographing member such as a line sensor or a two-dimensional TV camera, and then making defect-detection on the basis of the gained image data. Moreover, image data are gained in the state that a polarizing filter for inspection is interposed between the light source and the photographing member. Usually, the polarizing axis (for example, the polarizing absorption axis) of this polarizing film for inspection is arranged to give a state that the polarizing axis is perpendicular to the polarizing axis (for example, the polarizing absorption axis) of a polarizer of a sheet product to be inspected (crossed nicols relation state). According to the crossed nicols relation arrangement, an entirely black image is inputted from the photographing member when no defect is present. However, when defects are present, portions thereof do not turn black (the portions are recognized as bright spots). Accordingly, by setting an appropriate threshold value, the defects can be detected. According to such a bright spot detection, surface-adhesion substances, inside contaminants or the like can be detected as bright spots. Besides this bright spot detection, there is a method of photographing a transmitted light image of an object to be inspected by use of a CCD, and then analyzing the image to detect contaminants. There is also a method of photographing a reflected light image of an object to be inspected by use of a CCD, and then analyzing the image to detect surface-adhesion contaminants.

In each of the above-mentioned cutting steps, the half cutting manner, wherein a sheet product and members other than a release film are cut, has been described. However, the cutting manner used in any cutting step in the invention is not limited to the half cutting manner. In each of the above-mentioned bonding steps, wherein a sheet product is cut and subsequently bonded onto an optical display substrate, the bonding manner by use of paired rolls has been described. However, the bonding manner used in any bonding step in the invention is not limited to the paired roll manner.

(Pressure-Sensitive Adhesives)

Any one of the above-mentioned pressure-sensitive adhesive layers is not particularly limited, and may be made of an appropriate pressure-sensitive adhesive according to the prior art, such as an acrylic pressure-sensitive adhesive. The pressure-sensitive adhesive layer is preferably a pressure-sensitive adhesive layer having a low moisture absorption coefficient and an excellent heat resistance in order to prevent a bubbling phenomenon or peeling phenomenon based on moisture absorption, prevent a fall in optical characteristics or a warp of the liquid crystal cell on the basis of a thermal expansion difference or the like, and form an image display device high in quality and excellent in endurance. The pressure-sensitive adhesive layer may be a pressure-sensitive adhesive layer which contains fine particles to exhibit light diffusing performance, or some other layer. The pressure-sensitive adhesive layer may be optionally laid onto a layer for which the adhesive layer is necessary. For example, in the case of a polarizing plate composed of a polarizer and a polarizer protecting layer, it is advisable to lay the pressure-sensitive adhesive layer optionally onto one surface or each surface of the polarizer protecting layer.

(Release Films)

Any one of the release films may be an appropriate release film according to the prior art, for example, a product wherein an appropriate thin-leaf-form product is optionally coated with a peeling agent, such as a silicone type, long-chain alkyl type or fluorine-containing type peeling agent, or molybdenum sulfide; examples of the thin-leaf-form product include a plastic film, a rubber sheet, a paper piece, a cloth piece, a nonwoven cloth piece, a net, a foamed sheet and a metal foil piece, each of which may be of various types; and any laminate product made of two or more thereof.

(Surface Protecting Films)

Any one of the surface protecting films may be an appropriate film according to the prior art, for example, a product wherein an appropriate thin-leaf-form product is optionally coated with a peeling agent, such as a silicone type, long-chain alkyl type or fluorine-containing type peeling agent, or molybdenum sulfide; examples of the thin-leaf-form product include a plastic film, a rubber sheet, a paper piece, a cloth piece, a nonwoven cloth piece, a net, a foamed sheet and a metal foil piece, each of which may be of various types; and any laminate product made of two or more thereof.

An optical display unit manufactured according to the invention can be preferably used to form an image display device such as a liquid crystal display device, an organic EL display device, or a PDP.

The invention claimed is:

1. A method of manufacturing an optical display unit comprising cutting a long sheet product wherein a release film is laminated onto an optical film through a pressure-sensitive adhesive layer into a predetermined shape without cutting the release film, peeling off a pressure-sensitive adhesive attached optical film piece obtained by the cutting, which includes the pressure-sensitive adhesive layer and the optical film each having the predetermined shape, from the release film, and bonding the pressure-sensitive adhesive layer side of the optical film piece onto an optical display substrate, thereby manufacturing an optical display unit, wherein in a step of feeding the sheet product, a predicted feed distance at the time of feeding a position specifying data given to the sheet product from a first position at the upstream side of the feeding to a second position at the downstream side of the feeding from the first position is compared with the actually measured feed distance from the first position to the second position, the distance being obtained by detecting the position specifying data by use of a detecting means at each of the first and second positions and determining the distance based on the detection result by a feed distance measuring means that measures the feed distance of the sheet product, and the feed distance measuring means is corrected so that the actually measured feed distance is set within a predetermined range based on the predicted feed distance value.

2. The method of manufacturing an optical display unit according to claim 1, wherein the predicted feed distance is set based on empirical values in a test operation or an actual operation.

3. The method of manufacturing an optical display unit according to claim 1, wherein the detecting means at the second position is set up at the downstream side of a means for the cutting in the feeding direction, or at the upstream side thereof in the feeding direction.

4. The method of manufacturing an optical display unit according to claim 1, wherein the position specifying data is beforehand given onto the sheet product, and the sheet product is wound into a roll form.

5. The method of manufacturing an optical display unit according to claim 1, wherein the position specifying data is given onto the sheet product at the upstream side of the feeding from the first position.

6. The method of manufacturing an optical display unit according to claim 1, wherein when the actually measured feed distance is not within the predetermined range of the predicted feed distance, an alarm is issued about this fact.

7. The method of manufacturing an optical display unit according to claim 1, wherein the sheet product contains a defect existing in the pressure-sensitive adhesive layer and/or the optical film, and the sheet product is cut into the pressure-sensitive adhesive attached optical film piece from which the defect is excluded, the piece having the predetermined shape.

8. The method of manufacturing an optical display unit according to claim 1, wherein before the first position, the release film is peeled off from the sheet product to make a defect inspection of the optical film and the pressure-sensitive adhesive layer, and after the defect inspection the release film is next laminated onto the pressure-sensitive adhesive layer.

9. A manufacturing system of an optical display unit obtained by cutting a long sheet product wherein a release film is laminated onto an optical film through a pressure-sensitive adhesive layer into a predetermined shape without cutting the release film, peeling off a pressure-sensitive adhesive attached optical film piece obtained by the cutting, which includes the pressure-sensitive adhesive layer and the optical film each having the predetermined shape, from the release film, and bonding the pressure-sensitive adhesive layer side of the optical film piece onto an optical display substrate, comprising:

a feeding means that feeds the sheet product, a feeding control means that controls the feeding means, a feed distance measuring means that measures the feed distance of the sheet product, a comparing means wherein in a step of feeding the sheet product, a predicted feed distance at the time of feeding a position specifying data given to the sheet product from a first position at the upstream side of the feeding to a second position at the downstream side of the feeding from the first position is compared with an actually measured feed distance from the first position to the second position, the distance being obtained by detecting the position specifying data by use of a detecting means at each of the first and second positions and determining the distance based on the detection result by the feed distance measuring means, a correcting means that corrects the feed distance measuring means so that the actually measured feed distance is set within a predetermined range based on the predicted feed distance value, a cutting means that cuts the sheet product into the pressure-sensitive adhesive attached optical film piece having the predetermined shape, a peeling means that peels off the pressure-sensitive adhesive attached optical film piece from the release film, and a bonding means that bonds the pressure-sensitive adhesive layer side of the pressure-sensitive adhesive attached optical film piece, from which the release film is peeled off, onto an optical display substrate.

10. The manufacturing system of an optical display unit according to claim 9, wherein the predicted feed distance is set based on empirical values in a test operation or an actual operation.

11. The manufacturing system of an optical display unit according to claim 9, wherein the detecting means at the second position is set up at the downstream side of the cutting means in the feeding direction, or at the upstream side thereof in the feeding direction.

12. The manufacturing system of an optical display unit according to claim 9, which comprises a position specifying data forming means that gives the position specifying data to the sheet product at the upstream side of the feeding from the first position.

13. The manufacturing system of an optical display unit according to claim 9, which comprises an alarming means wherein when the actually measured feed distance is not within the predetermined range of the predicted feed distance, an alarm is issued about this fact.

14. The manufacturing system of an optical display unit according to claim 9, wherein the sheet product contains a defect existing in the pressure-sensitive adhesive layer and/or the optical film, and the sheet product is cut into the pressure-sensitive adhesive attached optical film piece from which the defect is excluded, the piece having the predetermined size.

15. The manufacturing system of an optical display unit according to claim 9, which further comprises:
- a peeling means that peels off the release film from the sheet product before the first position,
- a defect inspection means that makes a defect inspection of the optical film and the pressure-sensitive adhesive layer after the release film is peeled off, and
- a laminating means that laminates a release film onto the pressure-sensitive adhesive layer after the defect inspection.

\* \* \* \* \*